US008676043B2

(12) United States Patent
Yamaguchi et al.

(10) Patent No.: US 8,676,043 B2
(45) Date of Patent: Mar. 18, 2014

(54) VIDEO DATA PROCESSING SYSTEM, VIDEO SERVER, GATEWAY SERVER, AND VIDEO DATA MANAGEMENT METHOD

(71) Applicant: Kabushiki Kaisha Toshiba, Tokyo (JP)

(72) Inventors: Shuichi Yamaguchi, Tokyo (JP); Toshio Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/786,720

(22) Filed: Mar. 6, 2013

(65) Prior Publication Data

US 2013/0183025 A1    Jul. 18, 2013

Related U.S. Application Data

(62) Division of application No. 12/507,927, filed on Jul. 23, 2009, now Pat. No. 8,417,087.

(30) Foreign Application Priority Data

Sep. 16, 2008  (JP) ................. 2008-236967
Jun. 15, 2009  (JP) ................. 2009-142119

(51) Int. Cl.
*H04N 5/783* (2006.01)
*H04N 5/765* (2006.01)
*H04N 5/93* (2006.01)

(52) U.S. Cl.
USPC ............................ 386/343; 386/200; 386/353

(58) Field of Classification Search
None
See application file for complete search history.

(56) References Cited

U.S. PATENT DOCUMENTS

| 5,307,456 A | 4/1994 | MacKay |
| 5,583,876 A | 12/1996 | Kakuta |
| 6,211,869 B1 | 4/2001 | Loveman et al. |
| 6,535,686 B1 | 3/2003 | Yanase et al. |

(Continued)

FOREIGN PATENT DOCUMENTS

| EP | 0936615 A2 | 8/1999 |
| EP | 1503381 A2 | 2/2005 |

(Continued)

OTHER PUBLICATIONS

EPO Communication dated Nov. 2, 2009 including European Search Report for EP Application No. 09166326.0.

(Continued)

*Primary Examiner* — William C Vaughn, Jr.
*Assistant Examiner* — Asher Khan
(74) *Attorney, Agent, or Firm* — Finnegan, Henderson, Farabow, Garrett & Dunner, LLP

(57) ABSTRACT

A system includes a reading unit reading first management information including a first item specifying video data and the video data from a storage medium, a storage unit recording second management information including the first item obtained from the first management information and the video data transferred from the reading unit, a memory storing third management information including the first item and a second item specifying a transfer or no transfer of the video data, and a controller transferring the first management information to the memory from the reading unit, updating the second item of the third management information in response to the transfer of the video data, and controlling the transfer of the video data in the video content which is designated by a read request from one of the reading unit and the storage unit to the outside based on the second item of the third management information.

6 Claims, 39 Drawing Sheets

(56) References Cited

U.S. PATENT DOCUMENTS

| | | |
|---|---|---|
| 2002/0145622 A1 | 10/2002 | Kauffman et al. |
| 2004/0117398 A1* | 6/2004 | Idei et al. ........................ 707/102 |
| 2004/0148300 A1* | 7/2004 | Tohgi et al. ..................... 707/100 |
| 2005/0008327 A1 | 1/2005 | Shinkai |
| 2006/0206561 A1 | 9/2006 | Chen et al. |
| 2007/0106680 A1 | 5/2007 | Haot et al. |
| 2007/0168870 A1 | 7/2007 | Wada |
| 2007/0279787 A1 | 12/2007 | Ito et al. |
| 2009/0028181 A1* | 1/2009 | Shimon ........................ 370/466 |

FOREIGN PATENT DOCUMENTS

| | | |
|---|---|---|
| EP | 1796097 A1 | 6/2007 |
| JP | 2000-057693 | 2/2000 |
| JP | 2004-179913 | 6/2004 |
| JP | 2005-051491 | 2/2005 |
| JP | 2005-051544 | 2/2005 |
| JP | 2006-254270 | 9/2006 |
| JP | 2006-254372 | 9/2006 |
| KR | 2006-100942 | 9/2006 |
| TW | I258309 | 7/2006 |
| WO | WO 01/76252 A2 | 10/2001 |

OTHER PUBLICATIONS

Notification for Filing Opinion issued by the Korean Patent Office in Korean Patent Application No. 10-2009-0066718, mailed Jan. 14, 2011 (8 pages).

Office Action and Search Report issued by Taiwan Intellectual Property Office in Taiwan Application No. 098124711 mailed Sep. 20, 2012 (7 pages).

Notice of Reason for Rejection issued by the Japanese Patent Office in Japanese Patent Application No. 2009-142119, mailed Jul. 20, 2010.

* cited by examiner

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | – |
| L007 | Unassigned | D001 | – |
| L008 | Unassigned | D001 | – |
| L009 | Unassigned | D001 | – |
| L010 | Busy | D001 | h00000007 |

F I G. 3

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | |
| h00000009 | |

F I G. 4

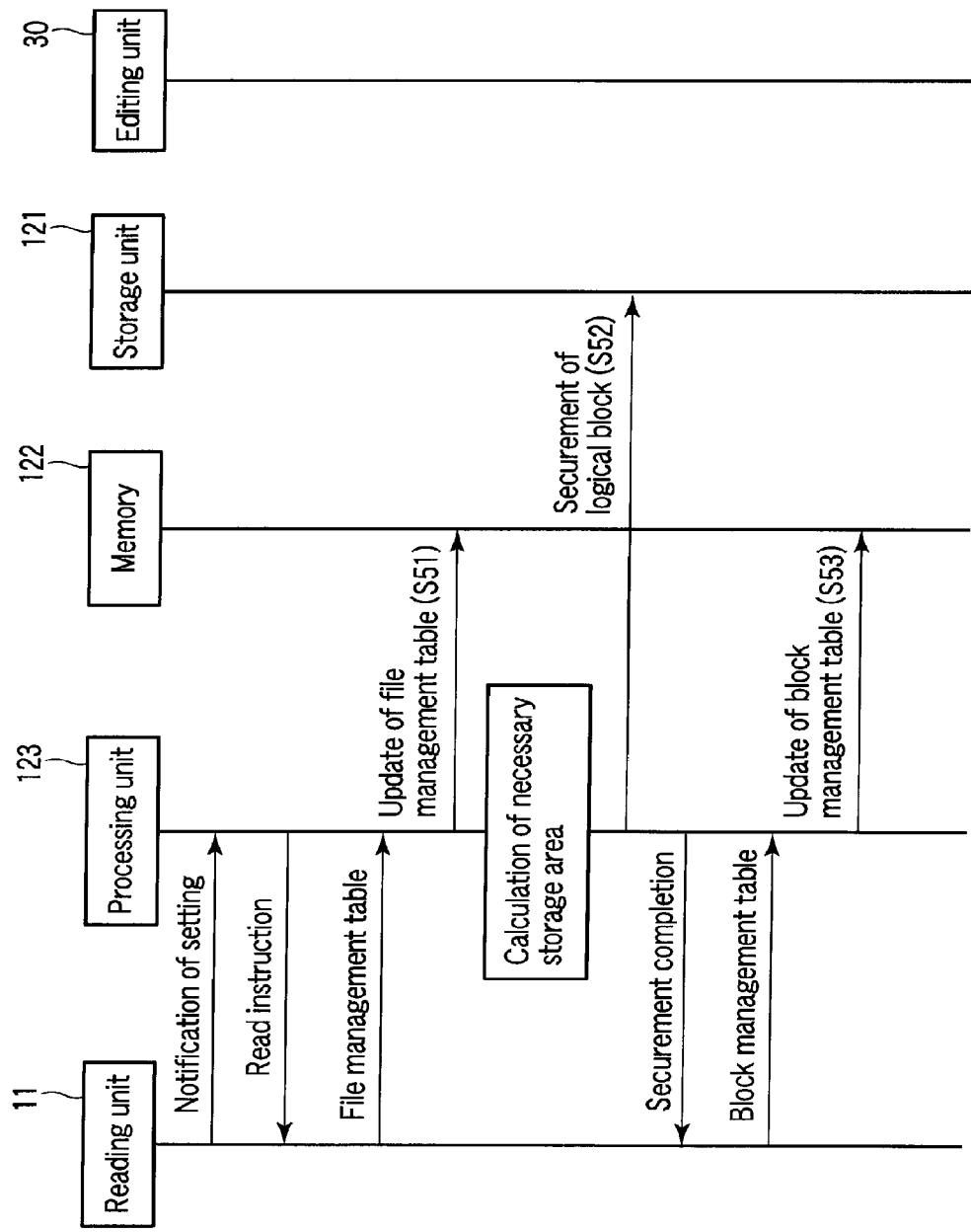
F I G. 5

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | – |
| L007 | Unassigned | D001 | – |
| L008 | Unassigned | D001 | – |
| L009 | Unassigned | D001 | – |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

F I G. 6A

Storage unit 121

(6B)

File management table

| File ID | File name | Logical block No. |
|---------|-----------|-------------------|
| F011 | Video content 11 | L101~L102 |
| F012 | Video content 12 | L103~L104 |

S52 → L105~L109
L120~L122

Block management table

| Logical block No. | State | Device ID | Physical address |
|---|---|---|---|
| L101 | Busy | D002 | h00000000 |
| L102 | Busy | D002 | h00000001 |
| L103 | Busy | D002 | h00000002 |
| L104 | Busy | D002 | h00000003 |
| L105 | Reserved | D002 | - |
| L106 | Reserved | D002 | - |
| L107 | Reserved | D002 | - |
| L108 | Reserved | D002 | - |
| L109 | Reserved | D002 | - |
| L110 | Unassigned | D002 | - |
| L111 | Unassigned | D002 | - |
| L112 | Unassigned | D002 | - |

Recorded data table

| Physical address | Data |
|---|---|
| h00000000 | Actual data |
| h00000001 | Actual data |
| h00000002 | Actual data |
| h00000003 | Actual data |
| h00000004 | |
| h00000005 | |
| h00000006 | |
| h00000007 | |
| h00000008 | |
| h00000009 | |

F I G. 6C

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | - |
| L007 | Unassigned | D001 | - |
| L008 | Unassigned | D001 | - |
| L009 | Unassigned | D001 | - |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

(8A)

F I G. 8A

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | – |
| L007 | Unassigned | D001 | – |
| L008 | Unassigned | D001 | – |
| L009 | Unassigned | D001 | – |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

F I G. 10A

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | – |
| L007 | Unassigned | D001 | – |
| L008 | Unassigned | D001 | – |
| L009 | Unassigned | D001 | – |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

F I G. 12A

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | - |
| L007 | Unassigned | D001 | - |
| L008 | Unassigned | D001 | - |
| L009 | Unassigned | D001 | - |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

F I G. 14A

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | — |
| L007 | Unassigned | D001 | — |
| L008 | Unassigned | D001 | — |
| L009 | Unassigned | D001 | — |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

F I G. 17A

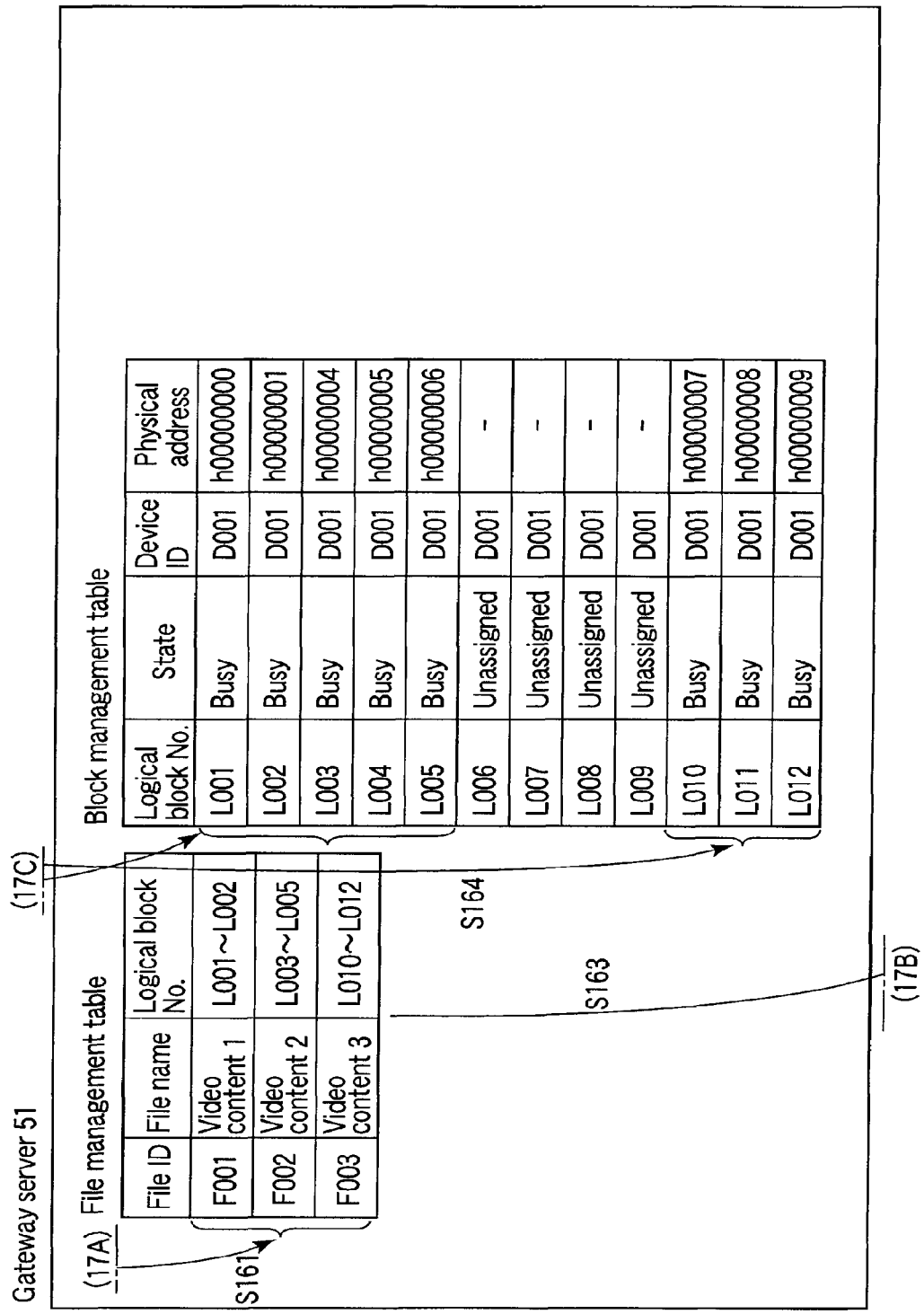
F I G. 17B

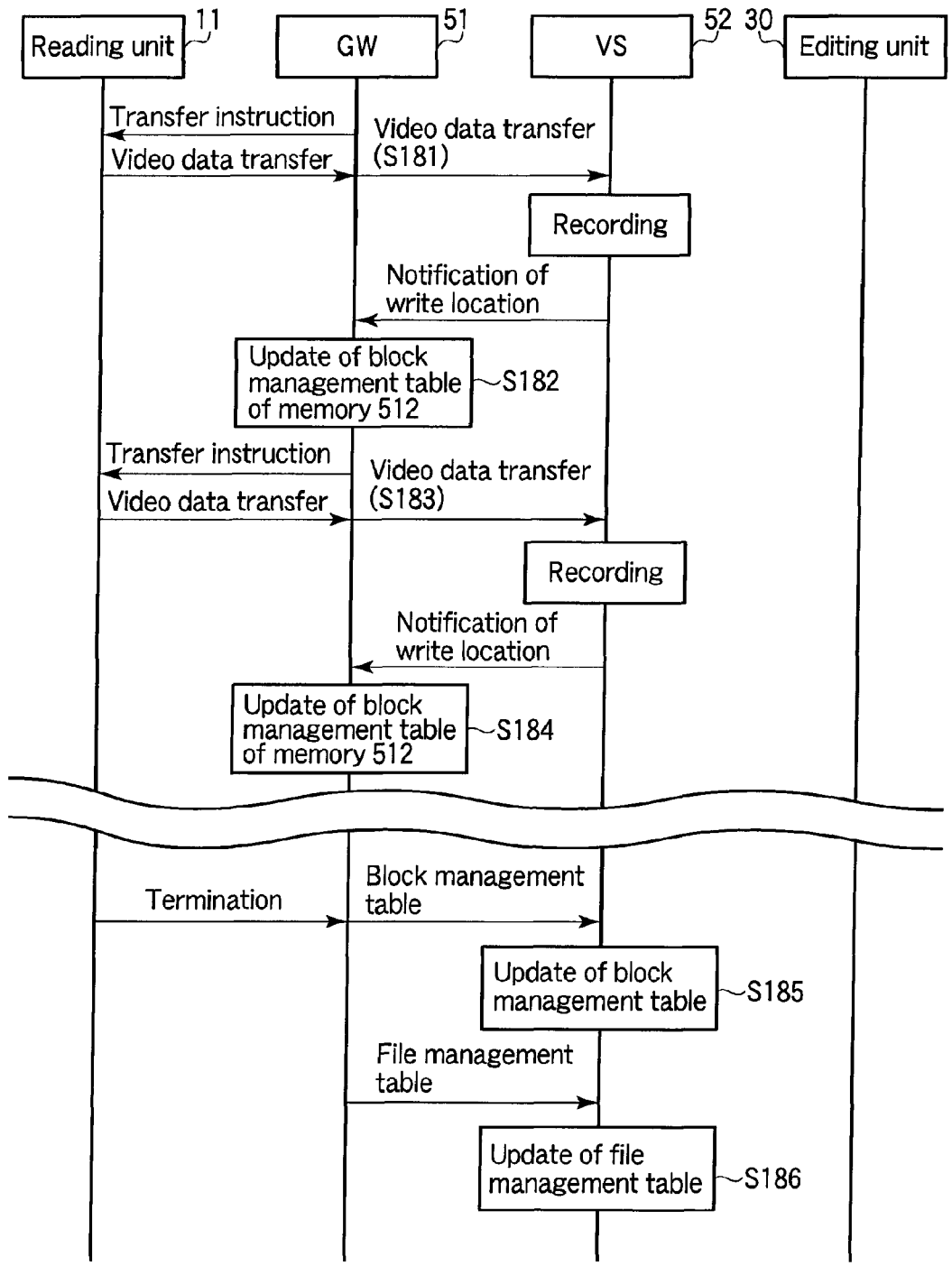
F I G. 18

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | - |
| L007 | Unassigned | D001 | - |
| L008 | Unassigned | D001 | - |
| L009 | Unassigned | D001 | - |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

S181
S183
(19A)

F I G. 19A

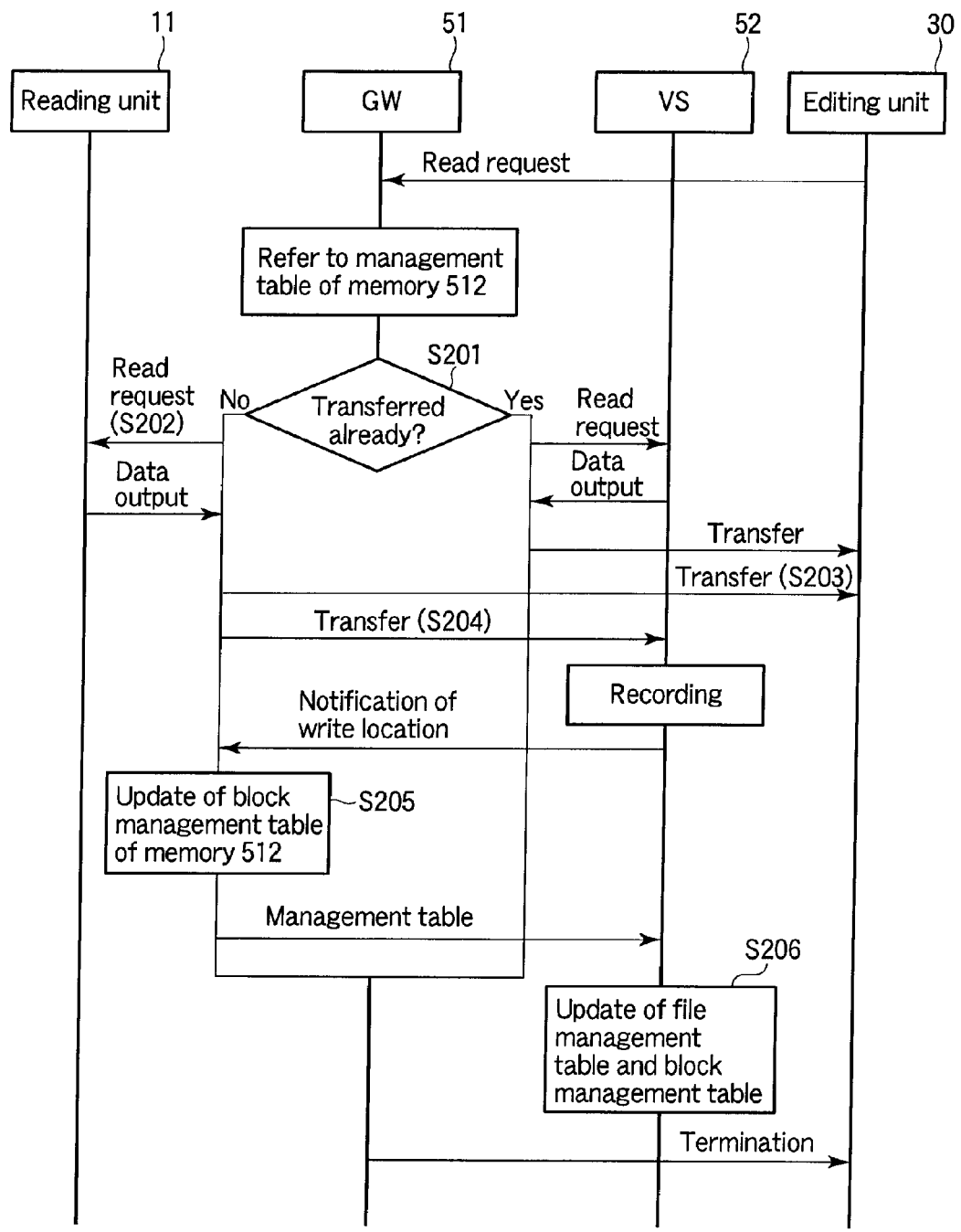
F I G. 20

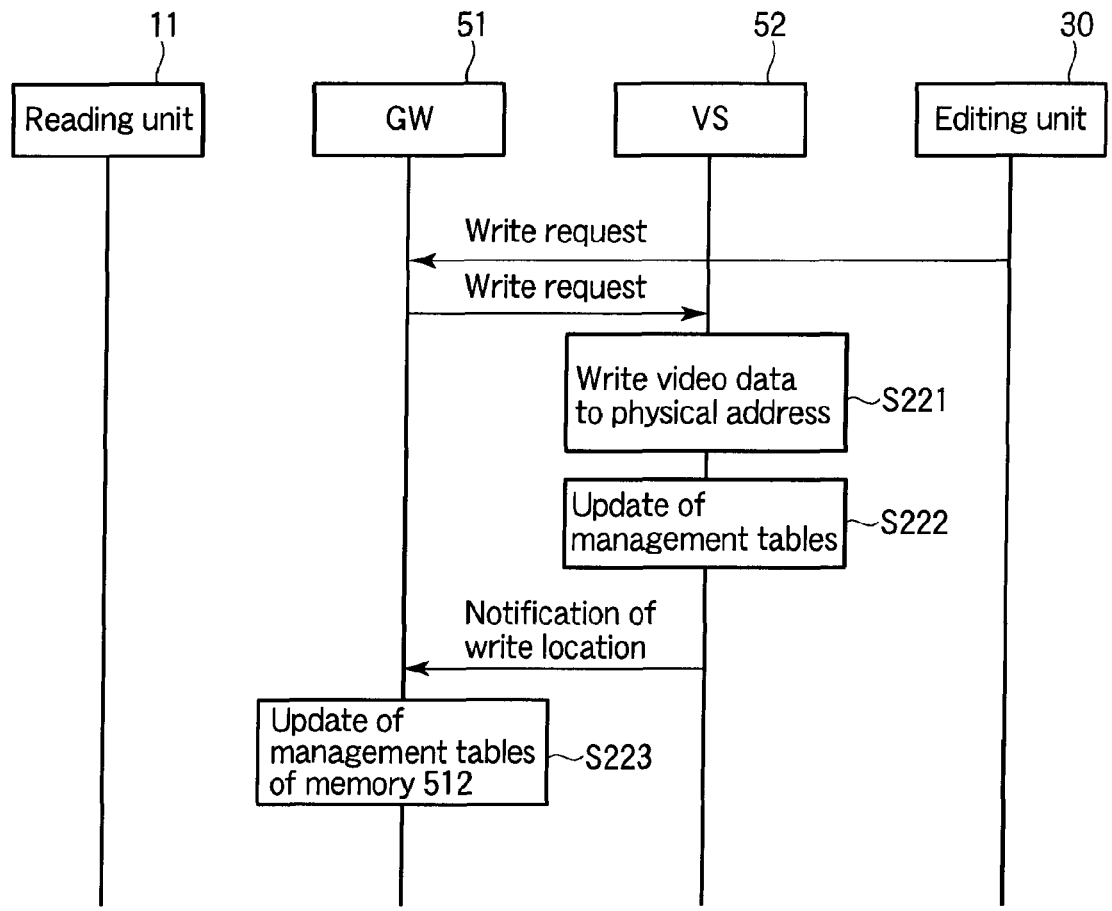
F I G. 22

Reading unit 11 (removable storage medium 20)

File management table

| File ID | File name | Logical block No. |
|---|---|---|
| F001 | Video content 1 | L001~L002 |
| F002 | Video content 2 | L003~L005 |
| F003 | Video content 3 | L010~L012 |

Block management table

| Logical block No. | State | Device ID | Physical address |
|---|---|---|---|
| L001 | Busy | D001 | h00000000 |
| L002 | Busy | D001 | h00000001 |
| L003 | Busy | D001 | h00000004 |
| L004 | Busy | D001 | h00000005 |
| L005 | Busy | D001 | h00000006 |
| L006 | Unassigned | D001 | – |
| L007 | Unassigned | D001 | – |
| L008 | Unassigned | D001 | – |
| L009 | Unassigned | D001 | – |
| L010 | Busy | D001 | h00000007 |
| L011 | Busy | D001 | h00000008 |
| L012 | Busy | D001 | h00000009 |

Recorded data table

| Physical address | Data |
|---|---|
| h00000000 | Actual data |
| h00000001 | Actual data |
| h00000002 | |
| h00000003 | |
| h00000004 | Actual data |
| h00000005 | Actual data |
| h00000006 | Actual data |
| h00000007 | Actual data |
| h00000008 | Actual data |
| h00000009 | Actual data |

F I G. 23A

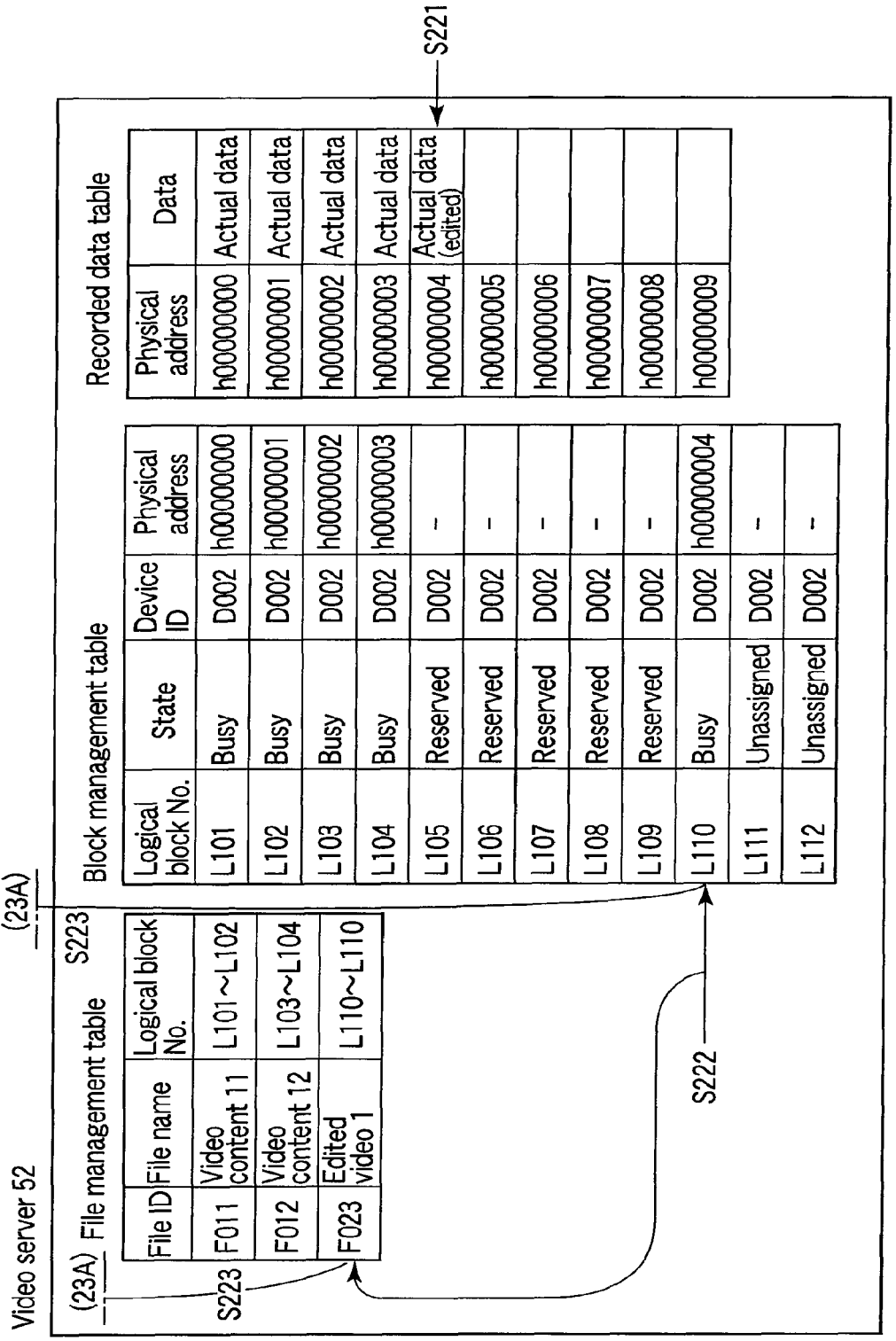
F I G. 23C

VIDEO DATA PROCESSING SYSTEM, VIDEO SERVER, GATEWAY SERVER, AND VIDEO DATA MANAGEMENT METHOD

CROSS-REFERENCE TO RELATED APPLICATIONS

This is a divisional of application Ser. No. 12/507,927, filed Jul. 23, 2009, which is incorporated herein by reference.

This application is based upon and claims the benefit of priority from prior Japanese Patent Applications No. 2008-236967, filed Sep. 16, 2008; and No. 2009-142119, filed Jun. 15, 2009, the entire contents of both of which are incorporated herein by reference.

BACKGROUND OF THE INVENTION

1. Field of the Invention

The present invention relates to a system for processing video data, a video server, a gateway server, and a method for managing and processing video data.

2. Description of the Related Art

In the conventional video data processing system, a video content of video contents are supplied from a video tape recorder (VTR) on which a moving picture and audio signals output from a video camera are recorded as the video content, are encoded and converted into a video file, and are recorded on a storage medium of a video server. When non-linear editing is carried out, an editing unit accesses the video server of the video data processing system, and reads a video file from the storage medium of the video server. Further, the editing unit carries out non-linear editing of the read video file. For this reason, in order to carry out non-linear editing, the imaged image must be encoded, and must wait until it is recorded on the storage medium of the video server.

Incidentally, in recent years, the storage medium of the video camera has been switched from a tape to a randomly accessible medium such as a hard disk, a semiconductor memory, and the like. When a semiconductor memory or the like is used as the storage medium of the video camera, it becomes possible to directly record a video signal from the video camera on the storage medium as a video file. As a result of this, it becomes unnecessary to subject the video signal from the VTR to encoding processing, and hence it becomes possible to shorten the waiting time up to the starting of the non-linear editing. However, the time for transferring the video file that has been imaged to the storage medium of the video server, and recording the video file is not resolved yet.

It should be noted that in order to shorten the time for transferring the video file to the video server, there is proposed, in Jpn. Pat. Appln. KOKAI Publication No. 2005-51491, a technique wherein an image signal, i.e., video data with low resolution and a small amount of data is transferred, editing work is then carried out, and then only data conforming to the editing content is transferred is proposed. However, although the waiting time is shortened by transferring data of low resolution, the waiting time is not eliminated. Further, using this method poses a problem that it is difficult to confirm the video data at the original image quality at the editing time.

BRIEF SUMMARY OF THE INVENTION

An object of the present invention is to provide a system for processing video data, a video server, a gateway server, and a method capable of starting non-linear editing of an acquired video file without waiting time.

According to an aspect of the present invention, there is provided a system for reading a video content from a storage medium, the video content being recorded in preset units of video data in the storage medium, the system comprising: a reading unit which is connected to the storage medium to generate a setting signal, and reads first management information including a first item specifying the units of video data in response to the setting signal and the unit or units of video data in the video content from the storage medium; a storage unit which records second management information including the first item obtained from the first management information and the unit or units of video data in the video content transferred from the reading unit; a memory which stores third management information including the first item and a second item specifying a transfer or no transfer of the unit or units of video data from the reading unit to the storage unit; and a controller which transfers the first management information to the memory from the reading unit in response to the setting signal to update the third management information, updates the second item of the third management information in response to the transfer of the unit or units of video data from the reading unit to the storage unit, and controls the transfer of the unit or units of video data in the video content which is designated by a read request from the outside of the system from one of the reading unit and the storage unit to the outside of the system in accordance to the second item of the third management information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing an example of a block management table stored in a memory shown in FIG. 1.

FIG. 4 is a view showing an example of video data written to a logical block in a removable storage medium and a storage unit shown in FIG. 1.

FIG. 5 is a sequence diagram of a case where the video data processing system of FIG. 1 prepares to transfer a video file recorded on a removable storage medium to a storage unit, and prepares to carry out non-linear editing of the video file by using a non-linear editing unit.

FIG. 6A is a view showing the states of the removable storage medium in the case where the processing of FIG. 5 is carried out.

FIG. 6C is a view showing the states of the storage unit in the case where the processing of FIG. 5 is carried out.

FIG. 8A is a view showing the states of the removable storage medium in the case where the processing of FIG. 7 is carried out.

FIG. 10A is a view showing the states of the removable storage medium in the case where the processing of FIG. 9 is carried out.

FIG. 12A is a view showing the states of the removable storage medium in the case where the processing of FIG. 11 is carried out.

FIG. 14A is a view showing the states of the removable storage medium in the case where the processing of FIG. 13 is carried out.

FIG. 17A is a view showing the states of the removable storage medium in the case where the processing of FIG. 16 is carried out.

FIG. 17B is a view showing the states of the gateway server in the case where the processing of FIG. 16 is carried out.

FIG. 18 is a sequence diagram of a case where after the processing of FIG. 16 is completed, a video file is transferred from the removable storage medium to the video server in the background.

FIG. 19A is a view showing the states of the removable storage medium in the case where the processing of FIG. 18 is carried out.

FIG. 20 is a sequence diagram of a case where after the preparation of FIG. 16 is completed, a request to read a video file recorded on the removable storage medium is received from a non-linear editing unit.

FIG. 22 is a sequence diagram of a case where after the preparation of FIG. 16 is completed, a request to write a video file that has already been edited is received from the non-linear editing unit.

FIG. 23A is a view showing the states of the removable storage medium in the case where the processing of FIG. 22 is carried out.

FIG. 23C is a view showing the states of the video server in the case where the processing of FIG. 22 is carried out.

DETAILED DESCRIPTION OF THE INVENTION

Embodiments of the present invention will be described below in detail while referring to the accompanying drawings.

First Embodiment

Figures 1, 2:
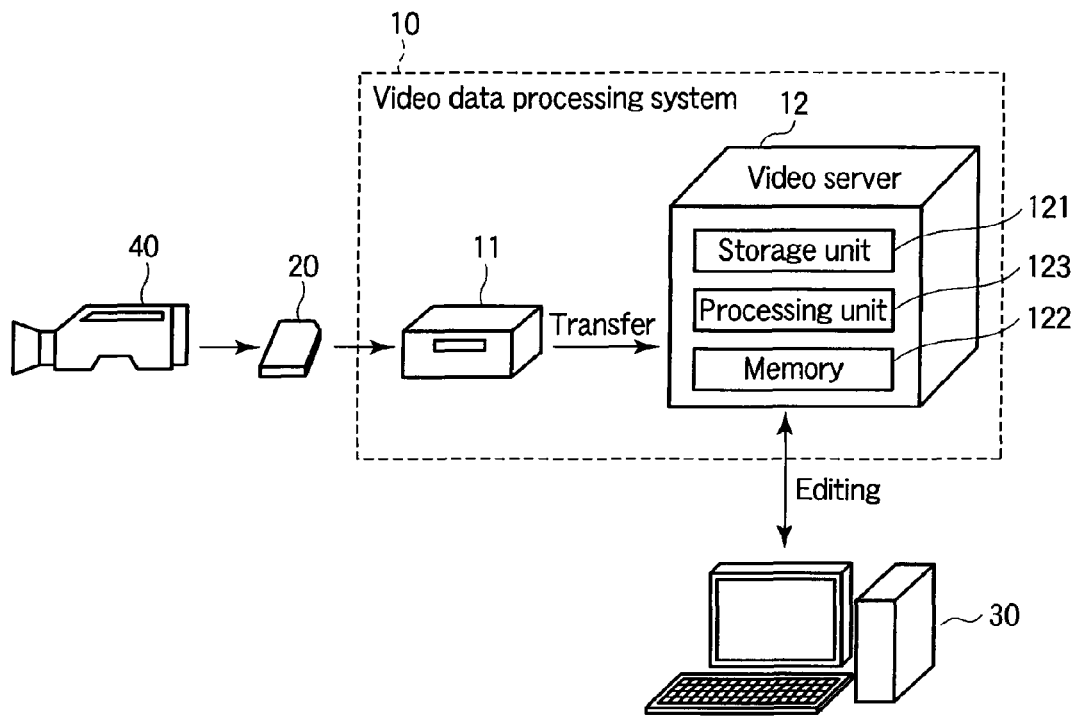
FIG. 1 is a view showing the configuration of a video data processing system according to a first embodiment of the present invention.
FIG. 2 is a view showing an example of a file management table stored in a memory shown in FIG. 1.

FIG. 1 is a schematic view showing the configuration of a video data processing system 10 according to a first embodiment of the present invention. The video data processing system 10 is provided with a reading unit 11, and a video server 12. The reading unit 11 has an insertion opening through which a removable storage medium 20 is inserted into the reading unit 11 and can be randomly accessed to the reading unit 11. A non-linear editing unit 30 is connected to the video server 12.

A video image or picture image taken by a camera 40 is converted into a video file, and is recorded on a removable storage medium 20. On the removable storage medium 20, a file management table for managing the recorded video file, and block management table for managing the recording state of the storage medium are recorded in advance, and if a video file is recorded thereon, these tables are updated in accordance with the recorded video file. It should be noted that the file management table and the block management table stored in the removable storage medium 20 have same structures as file management tables and block management tables stored in a storage unit 121 and a memory 122 in the video server 12. The structures of the file management tables and the block management tables will be described later in detail.

The removable storage medium 20 is constituted of, for example, a semiconductor storage medium such as a flash memory and the like, or a hard disk or the like, and is set in the reading unit 11 through the insertion opening. The video file recorded on the removable storage medium 20 is read by the reading unit 11, and is transferred to the video server 12.

The video server 12 is provided with a storage unit 121, a memory 122, and a processing unit 123. The storage unit 121 is a storage medium constituted of a semiconductor storage medium such as a flash memory and the like, or a hard disk or the like. As the memory 122, for example, a random access memory (RAM) is used. The processing unit 123 is embodied as a controller for controlling the units in the video server 12, and is configured by a microprocessor such as a central processing unit (CPU) or the like.

When the removable storage medium 20 is connected to the reading unit 11, the processing unit 123 updates the file management table and the block management table recorded in advance in each of the storage unit 121 and memory 122, prepares to transfer a video file recorded on the removable storage medium 20 to the storage unit 121, and prepares to carry out non-linear editing of the video file by using the non-linear editing unit 30.

If the preparation for transfer of the video file recorded on the removable storage medium 20 is completed, the processing unit 123 transfers the video file to the storage unit 121, and updates the file management tables and block management tables of the memory 122 and storage unit 121.

If the processing unit 123 receives a request to read the video file from the non-linear editing unit 30, the unit 123 outputs the requested video file to the non-linear editing unit 30 by referring to the file management tables and block management tables recorded on removable storage medium 20, memory 122, and storage unit 121.

If the processing unit 123 receives a request to write the video file from the non-linear editing unit 30, the unit 123 records the video file in the storage unit 121, and updates the file management tables and block management tables of the storage unit 121 and memory 122.

The non-linear editing unit 30 is a device for carrying out non-linear editing of the video file. The non-linear editing unit 30 accesses the video server 12, and requests the video server 12 to read a video file desired to be edited. Further, the non-linear editing unit 30 requests the video server 12 to write the video file that has already been edited.

Next, the processing operation of the video data processing system 10 configured as described above will be described below in detail. Specific examples of the file management table and the block management table in this embodiment are shown in FIGS. 2 and 3, respectively. FIG. 2 is a view showing an example of the file management table possessed by each of the removable storage medium 20, storage unit 121, and memory 122, and FIG. 3 is a view showing an example of the block management table possessed by each of the removable storage medium 20, storage unit 121, and memory 122. In the file management table, a file ID of the video file, file name, and number of the logical blocks in which the video file is recorded are shown. It should be noted that the logical block indicates a minimum management unit of a storage area on the removable storage medium 20 and storage unit 121, and the video file is written/read in units of a logical block. Further, in the block management table, a logical block No., usage state of the logical block, ID of a device to which the logical block belongs, and physical address of the logical block are shown. It should be noted that in this embodiment, a device ID: D001 indicates a removable storage medium 20, and device ID: D002 indicates a storage unit 121. Further, video data is written to the logical blocks of the removable storage medium 20 and storage unit 121 as shown in, for example, FIG. 4.

Figure 6B:
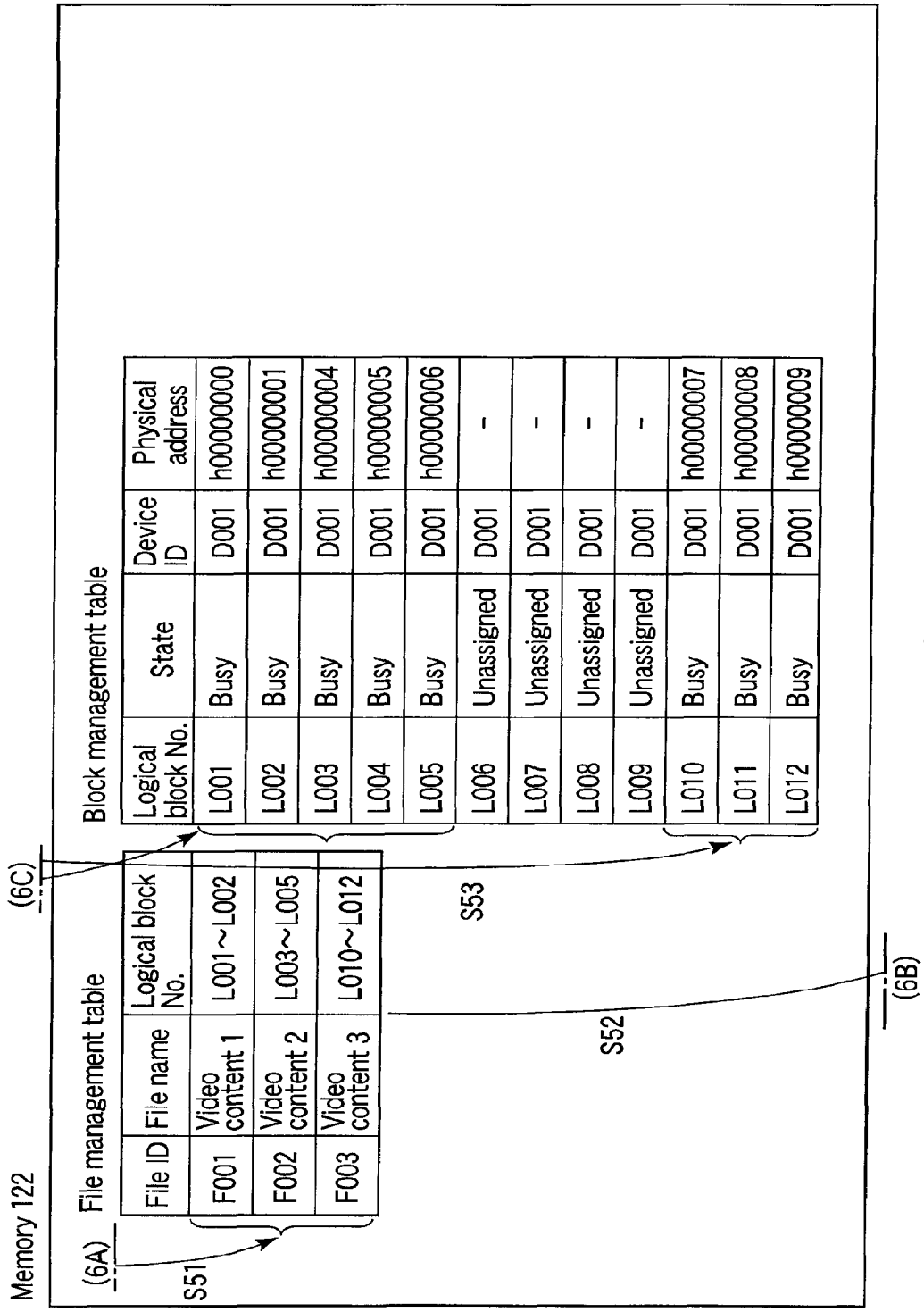
FIG. 6B is a view showing the states of the memory in the case where the processing of FIG. 5 is carried out.

FIG. 5 is a sequence diagram of a case where the video data processing system 10 according to the first embodiment of the present invention prepares to transfer a video file recorded on the removable storage medium 20 to the storage unit 121, and prepares to carry out non-linear editing of the video file by using the non-linear editing unit 30. Further, FIG. 6 is a schematic view showing the states of the removable storage medium 20, memory 122, and storage unit 121 in the case where the video data processing system 10 carries out the processing shown in FIG. 5. FIG. 6A shows the states of the removable storage medium 20. FIG. 6B shows the states of the memory 122. FIG. 6C shows the states of the storage unit 121.

In FIG. 5, when the removable storage medium 20 is set, the reading unit 11 notifies the processing unit 123 that the removable storage medium 20 is set. On receiving the notification indicating that the removable storage medium 20 is set, the processing unit 123 causes the reading unit 11 to read information about the file management table. The reading unit 11 outputs the information about the file management table of the removable storage medium 20 to the processing unit 123.

The processing unit 123 updates the file management table of the memory 122 on the basis of the information about the file management table (S51). As a result of this, the information of the file management table of the removable storage medium 20 is written to the file management table of the memory 122.

Subsequently, the processing unit 123 calculates a storage area necessary for recording video contents 1 to 3 on the storage unit 121, and secures a logical block of the storage unit 121 on the basis of the calculated storage area (S52). As a result of this, in the storage unit 121, logical block Nos.: L105 and L106 for recording the video content 1 are secured, logical block Nos.: L107 to L109 for recording the video content 2 are secured, and logical block Nos.: L120 to L122 for recording the video content 3 are secured. On completing securing the storage area in the storage unit 121, the processing unit 123 notifies the completion to the reading unit 11, which, as a result, outputs information about the block management table of the removable storage medium 20 to the processing unit 123. The processing unit 123 updates the block management table of the memory 122 on the basis of the information about the block management table (S53).

When the removable storage medium 20 is set at the reading unit 11 as described above, the video data processing system 10 updates the file management table and the block management table of the memory 122 on the basis of the file management table and the block management table of the removable storage medium 20. As a result of this, in the memory 122, the management tables of the removable storage medium 20 are managed. That is, it can be considered that the video file recorded on the removable storage medium 20 is virtually recorded on the video server 12.

Processing to be performed after the preparation for transfer of the video file recorded on the removable storage medium 20 to the storage unit 121, and the preparation for non-linear editing of the video file by using the non-linear editing unit 30 have been completed by the processing shown in FIG. 5 will be described below.

Figure 7:
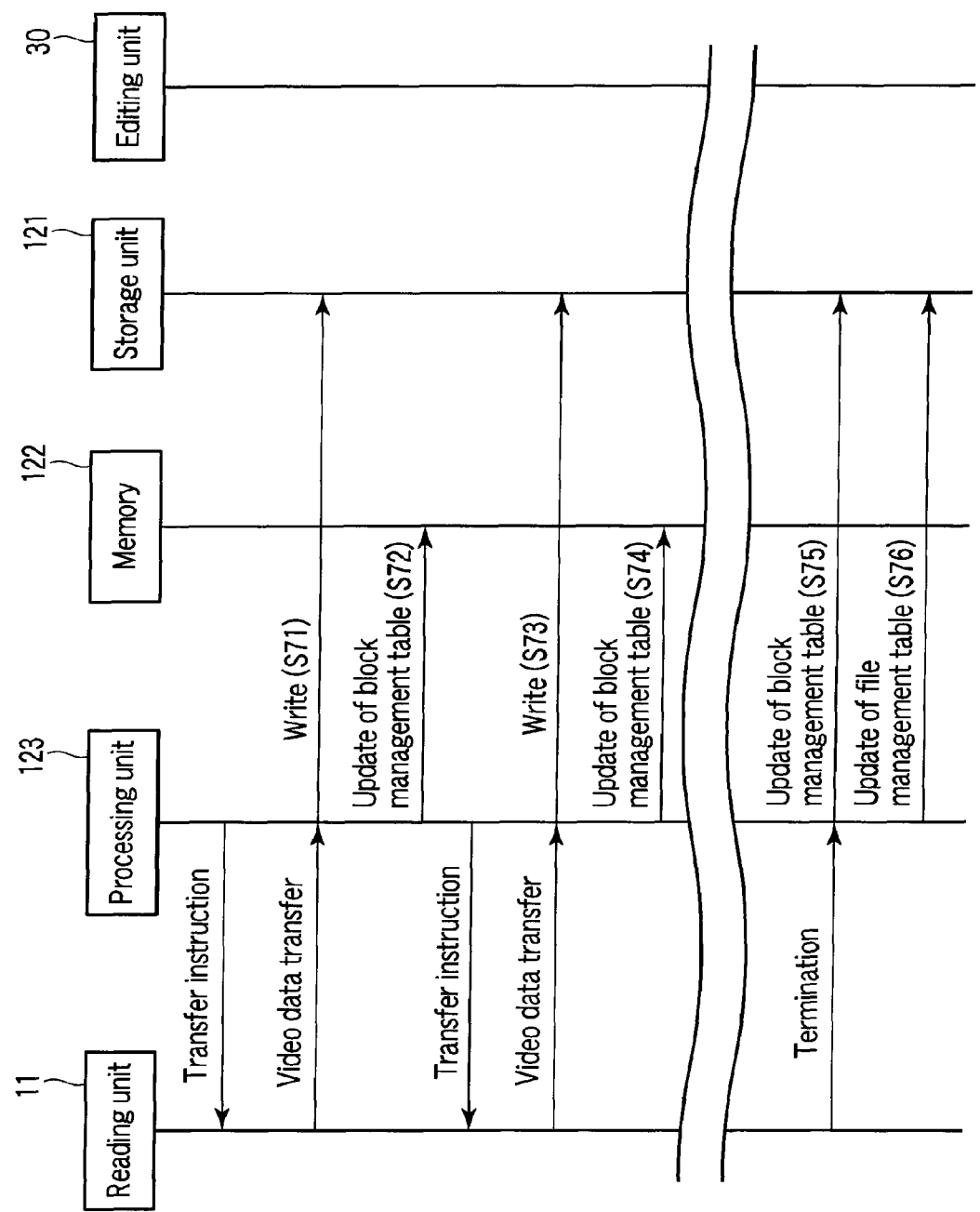
FIG. 7 is a sequence diagram of a case where after the processing of FIG. 5 is completed, a video file is transferred from the removable storage medium to the storage unit in the background.
Figure 8B:
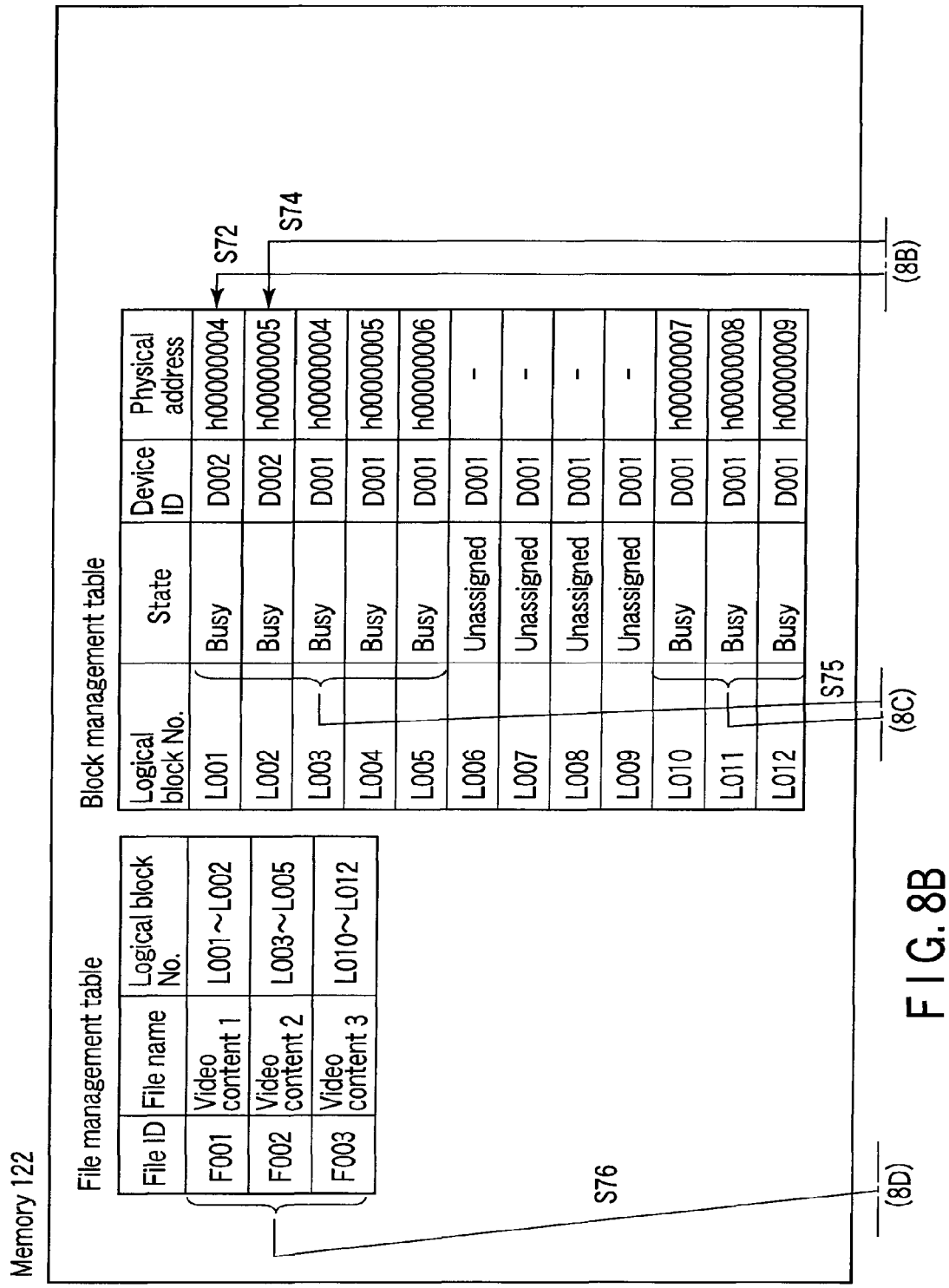
FIG. 8B is a view showing the states of the memory in the case where the processing of FIG. 7 is carried out.
Figure 8C:
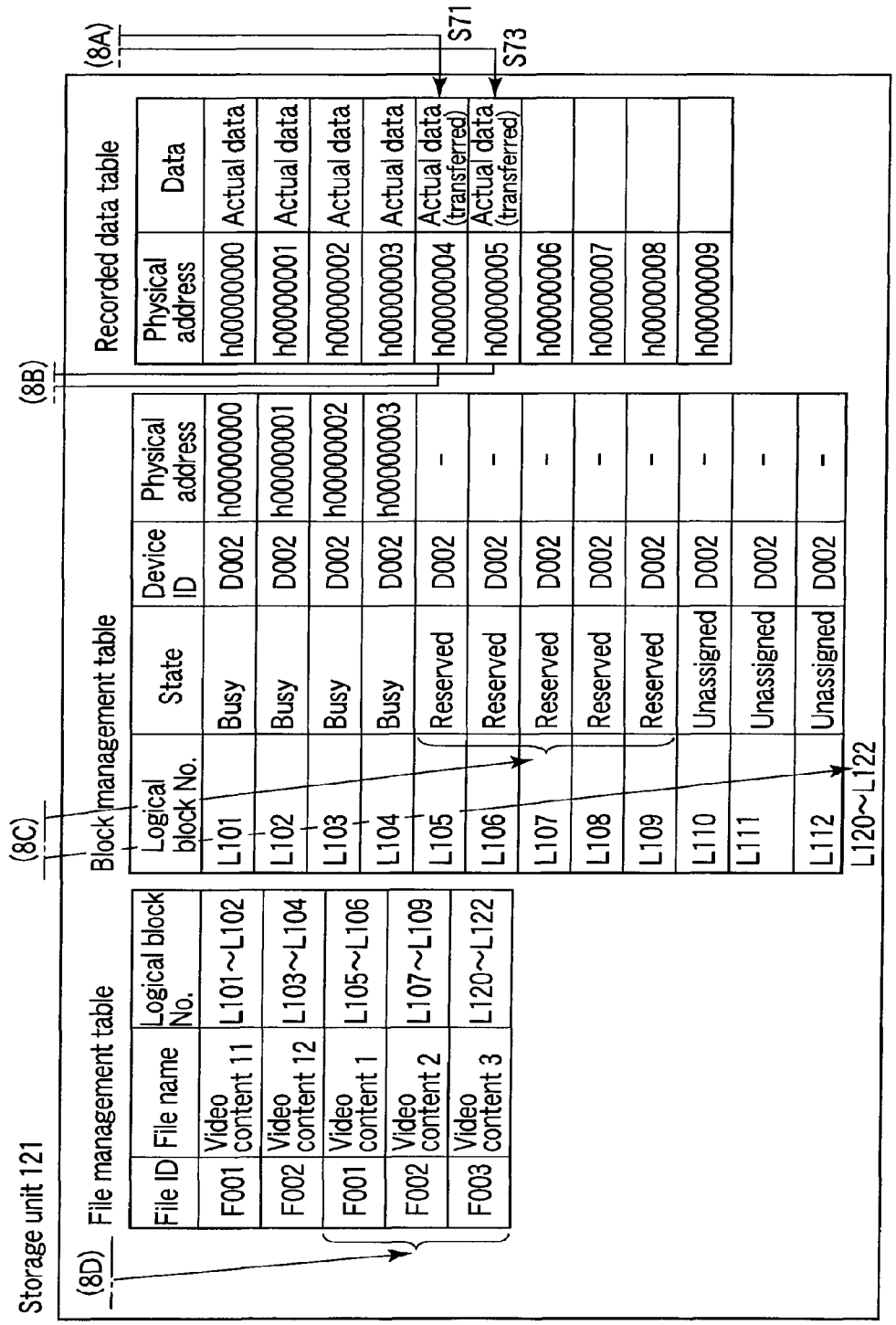
FIG. 8C is a view showing the states of the storage unit in the case where the processing of FIG. 7 is carried out.

First, the case where after the processing shown in FIG. 5 is completed, the video file is transferred from the removable storage medium 20 to the storage unit 121 in the background will be described below. FIG. 7 is a sequence diagram at the time. Further, FIG. 8 is a schematic view showing the states of the removable storage medium 20, memory 122, and storage unit 121 in the case where the video data processing system 10 carries out the processing shown in FIG. 7. FIG. 8A shows the states of the removable storage medium 20. FIG. 8B shows the states of the memory 122. FIG. 8C shows the states of the storage unit 121.

In FIG. 7, the processing unit 123 gives an instruction to transfer the video content 1 which is the video file recorded on the removable storage medium 20 to the reading unit 11. On receiving the instruction, the reading unit 11 transfers the video content 1 to the video server 12 in units of video data. The processing unit 123 records the video data transferred from the removable storage medium 20 on an unassigned address: h00000004 of the storage unit 121 (S71). The processing unit 123 updates the block management table of the memory 122 on the basis of the write location of the video data in the storage unit 121, sets the device ID of the logical block No.: L001 to D002, and sets the physical address to h00000004 (S72).

When the block management table of the memory 122 is updated, the processing unit 123 gives the reading unit 11 an instruction to transfer the next video data. The reading unit 11 reads the next video data from the removable storage medium 20, and transfers the video data to the video server 12. The processing unit 123 records the video data transferred from the removable storage medium 20 on an unassigned address: h00000005 of the storage unit 121 (S73). When the recording of the video data is completed, the processing unit 123 updates the block management table of the memory 122 on the basis of the write location of the video data in the storage unit 121, sets the device ID of the logical block No.: L002 to D002, and sets the physical address to h00000005 (S74). As a result of this, the video content 1 is transferred from the removable storage medium 20 to the storage unit 121.

The video data processing system 10 repeats the processing of S71 to S74 to transfer the video contents 2 and 3 which are video files recorded on the removable storage medium 20 to the storage unit 121. Further, on completing the transfer of the video files recorded on the removable storage medium 20, the reading unit 11 notifies the video server 12 that the transfer of the video files recorded on the removable storage medium 20 has been completed. On receiving the notification indicating that the transfer has been completed, the processing unit 123 updates the block management table of the storage unit 121 on the basis of the block management table of the memory 122 (S75). That is, the device IDs and physical addresses of the logical block Nos.: L105 to L109, and L120 to L122 in the storage unit 121 are rewritten to be changed to the device IDs and physical addresses of the logical block Nos.: L001 to L005, and L010 to L012 in the memory 122, and the states of the logical block Nos.: L105 to L109, and L120 to L122 in the storage unit 121 are rewritten to be changed to busy (in use). Subsequently, the processing unit 123 updates the file management table of the storage unit 121 on the basis of the file management table of the memory 122. That is, the video contents 1 to 3 transferred from the removable storage medium 20 are written to the file management table of the storage unit 121 (S76). As a result of this, the transfer processing is completed.

As described above, the processing unit 123 transfers the video data from the reading unit 11 to the storage unit 121, and updates the block management table of the memory 122. Further, if the transfer of the video data is completed, the processing unit 123 updates the file management table and the block management table of the storage unit 121 on the basis of the file management table and the block management table of the memory 122. As a result of this, in the video data processing system, it becomes possible, after the completion of the video file transfer, to merge the file management table and the block management table of the memory 122 into the file management table and the block management table of the storage unit 121. Accordingly, it becomes possible to improve the transfer efficiency of the video file. It should be noted that this transfer processing can be executed while the non-linear editing is executed by the non-linear editing unit 30.

In the case where the storage media of the removable storage medium 20 and storage unit 121 are semiconductor storage media, it can be assumed that the storage unit 121 is higher than the reading unit 11 in the input/output performance of the video data. In this case, the video files with the stronger possibility of being accessed are transferred to the video server earlier, whereby it becomes possible to improve the response speed with respect to the editing operation. Specific examples of the above will be shown below.

The processing unit 123 may give a transfer instruction to the reading unit 11 in such a manner that video data of a plurality of consecutive logical blocks on which video files which become objects of read requests are recorded is preferentially transferred. As a result of this, it becomes possible to preferentially transfer video data with the stronger possibility of being accessed to the storage unit 121.

The processing unit 123 may give a transfer instruction to the reading unit 11 in such a manner that a video file in which the creation time, update time or the like is close to that of the video file that has been requested to be read is preferentially transferred.

The processing unit 123 may give a transfer instruction to the reading unit 11 in such a manner that a video file in which the creation time is the latest is preferentially transferred.

The processing unit 123 may give a transfer instruction to the reading unit 11 in such a manner that video data of a logical block on which the leading head of the video file is recorded for the convenience of preview or the like is preferentially transferred.

An order determination unit for determining the transfer order of video data by predicting a video file which will become an object of a read request from the past tendency of access from the non-linear editing unit 30 is provided in the video server 12. Further, the processing unit 123 may give a transfer instruction to the reading unit 11 in such a manner that the video data are transferred preferentially in accordance with the order determined by the order determination unit.

Figure 9:
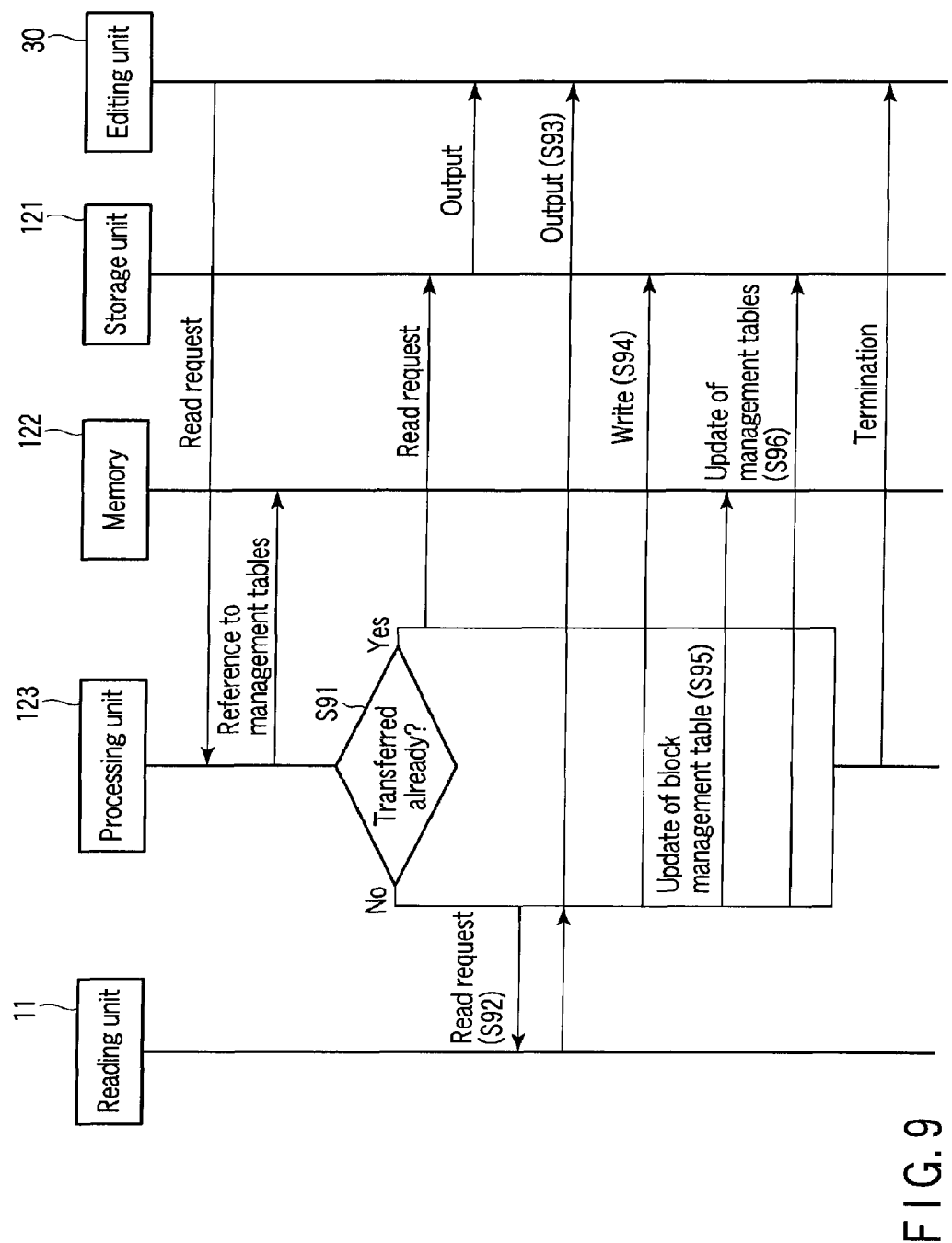
FIG. 9 is a sequence diagram of a case where after the preparation of FIG. 5 is completed, a request to read a video file recorded on the removable storage medium is received from the non-linear editing unit.

Next, the case where after the preparation of FIG. 5 is completed, a request to read a video file recorded on the removable storage medium 20 is received from the non-linear editing unit 30 will be described below. FIG. 9 is a sequence diagram at that time.

In FIG. 9, on receiving a request to read the video file from the non-linear editing unit 30, the processing unit 123 refers to the file management table of the memory 122 to specify a logical block to be accessed. When the logical block to be accessed is specified, the processing unit 123 refers to the device ID and physical address shown in the block management table of the memory 122 to determine whether or not the video file which is requested to be read has already been transferred to the storage unit 121 (S91). That is, the processing unit 123 determines whether the video data of the video file is recorded on one of the removable storage medium 20 or storage unit 121.

When the video data of the video file is recorded on the storage unit 121, the processing unit 123 transfers the read request to the storage unit 121. On receiving the read request, the storage unit 121 outputs in sequence the video data of the video file which is requested to be read to the non-linear editing unit 30.

In the case where the video data of the video file is recorded on the removable storage medium 20, the processing unit 123 transfers the read request to the reading unit 11 (S92). On receiving the read request, the reading unit 11 reads the video data of the video file which is requested to be read from the removable storage medium 20. The processing unit 123 outputs in sequence the video data read by the reading unit 11 to the non-linear editing unit 30 (S93).

When the processing unit 123 outputs the video data to the non-linear editing unit 30, the unit 123 writes the video data to the storage unit 121 in sequence (S94). On completing the recording of the video data on the storage unit 121, the processing unit 123 updates the block management table of the memory 122 on the basis of the write location of the video data (S95). Further, on completing the transfer of the video file to the storage unit 121, the processing unit 123 updates the file management table and the block management table of the storage unit 121 on the basis of the file management table and the block management table of the memory 122 (S96).

When the output of the video file requested by the non-linear editing unit 30 is completed, the processing unit 123 notifies the non-linear editing unit 30 that the output of the video file is completed.

Figure 10B:
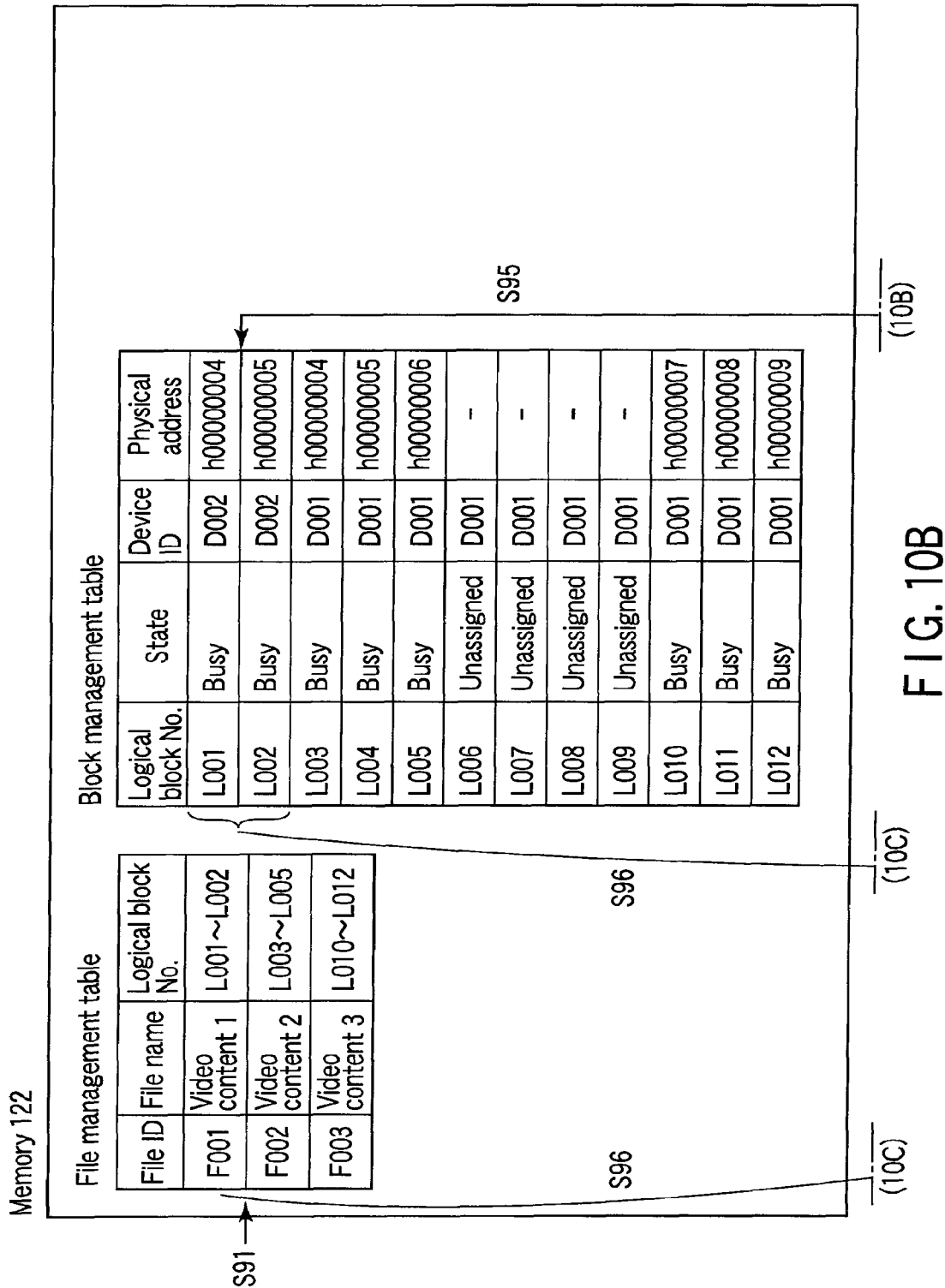
FIG. 10B is a view showing the states of the memory in the case where the processing of FIG. 9 is carried out.
Figure 10C:
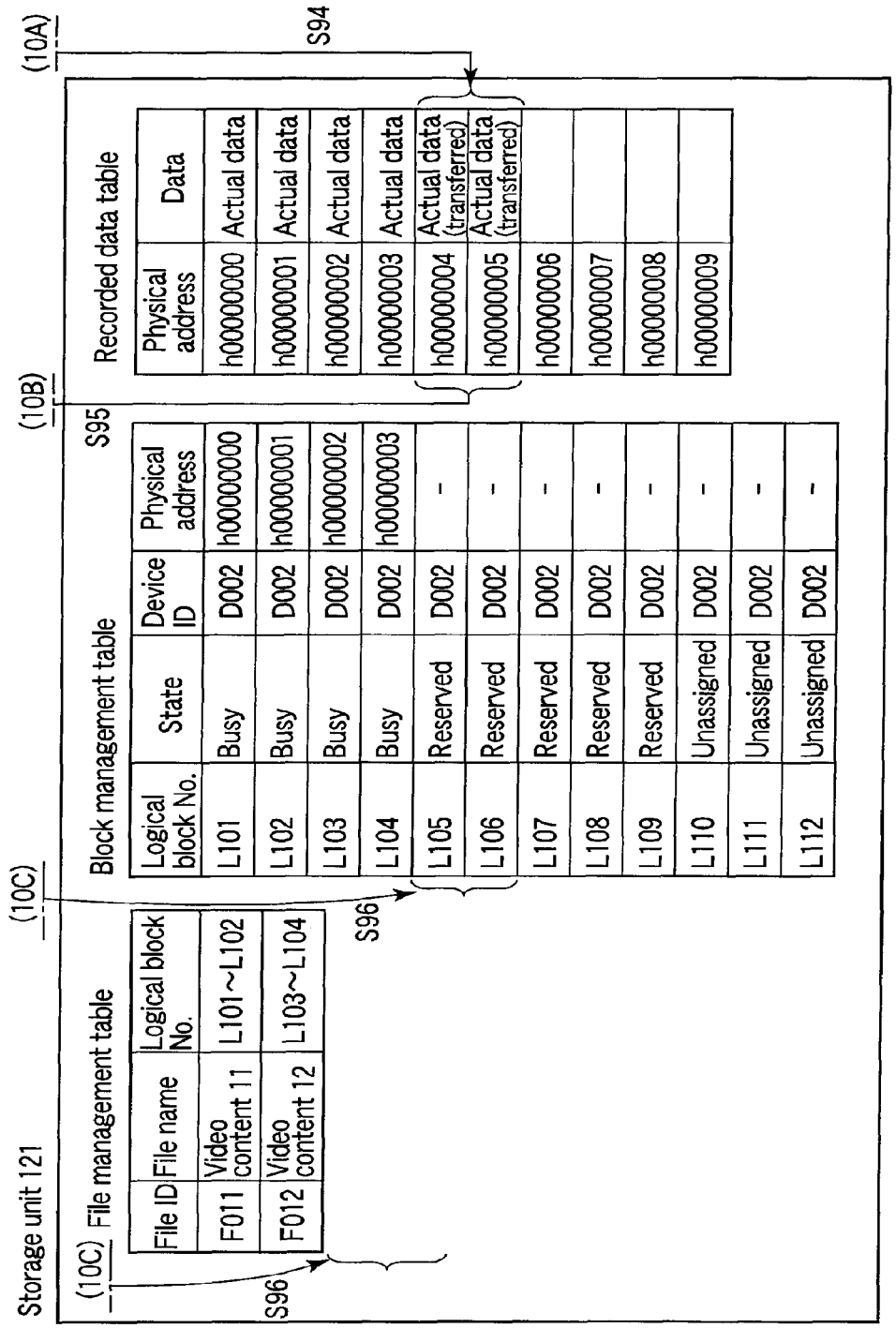
FIG. 10C is a view showing the states of the storage unit in the case where the processing of FIG. 9 is carried out.

FIG. 10 is a schematic view showing the states of the removable storage medium 20, memory 122, and storage unit 121 in the case where a request to read the video content 1 is input from the non-linear editing unit 30. FIG. 10A shows the states of the removable storage medium 20. FIG. 10B shows the states of the memory 122. FIG. 10C shows the states of the storage unit 121.

On receiving the read request of the video content 1 from the non-linear editing unit 30, the processing unit 123 refers to the file management table and the block management table of the memory 122 to determine that the video content 1 is recorded on the removable storage medium 20 (S91). The processing unit 123 transfers the read request of the video content 1 to the reading unit 11 (S92). On receiving the read request, the reading unit 11 reads the video data of the video content 1 from the removable storage medium 20 (S93). The processing unit 123 outputs the read video data to the non-linear editing unit 30 in sequence.

When the processing unit 123 outputs the video data of the video content 1 to the non-linear editing unit 30, the unit 123 writes the video data in sequence to the video server 12 (S94). As a result of this, the video data transferred from the removable storage medium 20 is recorded on the unassigned addresses: h00000004 and h00000005 of the storage unit 121. When the processing unit 123 has written the video data to the logical block of the storage unit 121, the unit 123 updates the block management table of the memory 122 on the basis of the write location thereof (S95). As a result of this, the device IDs of the logical block Nos.: L001 and L002 of the memory 122 become D002, and the physical addresses become h00000004 and h00000005. Further, on completing the transfer of the video content 1, the processing unit 123 updates the file management table and the block management table of the storage unit 121 on the basis of the file management table and the block management table of the memory 122 (S96).

As described above, in the video data processing system 10, if the read request of the video file is input from the non-linear editing unit 30, the storage position of the video data of the requested video file is determined by referring to the file management table and the block management table of the memory 122. Further, if the storage position of the video data is determined, the processing unit 123 outputs the video file to the non-linear editing unit 30 by reading the video data in sequence from the storage position of the video data. As a result of this, it becomes possible for the video data processing system 10 to output the video file to the non-linear editing unit 30, even if the video file of the removable storage medium 20 has not been transferred to the storage unit 121. That is, it is possible for the non-linear editing unit 30 to start non-linear editing of the video file even if the video file recorded on the removable storage medium 20 has not been transferred to the storage unit 121.

In the case where a video file which will become an object of a read request is recorded on the removable storage medium 20, the video data processing system 10 outputs the video data thereof to the non-linear editing unit 30, and simultaneously writes the video data to the storage unit 121. As a result of this, the transfer efficiency of the video file is improved.

Figure 11:
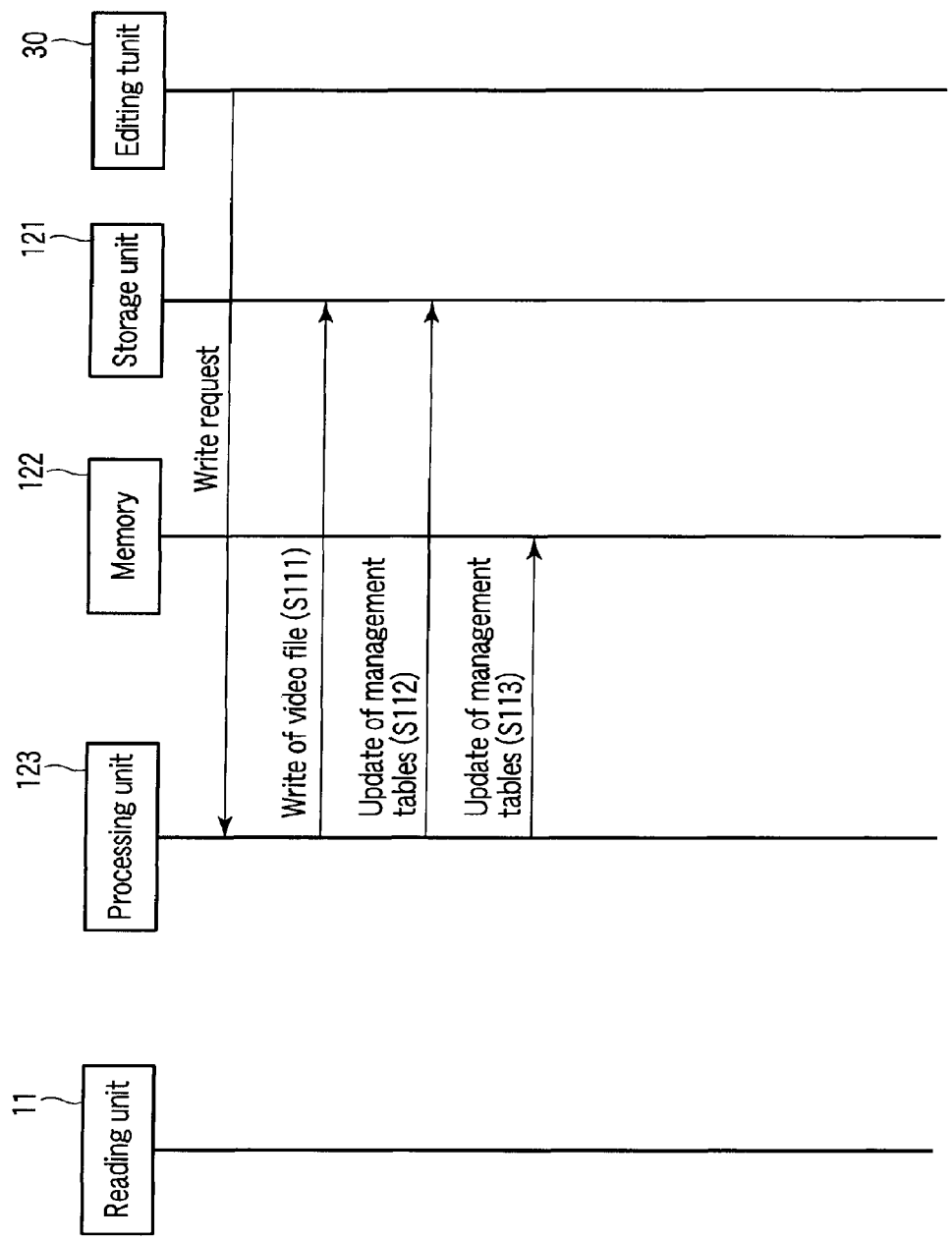
FIG. 11 is a sequence diagram of a case where after the preparation of FIG. 5 is completed, a request to write a video file that has already been edited is received from the non-linear editing unit.
Figure 12B:
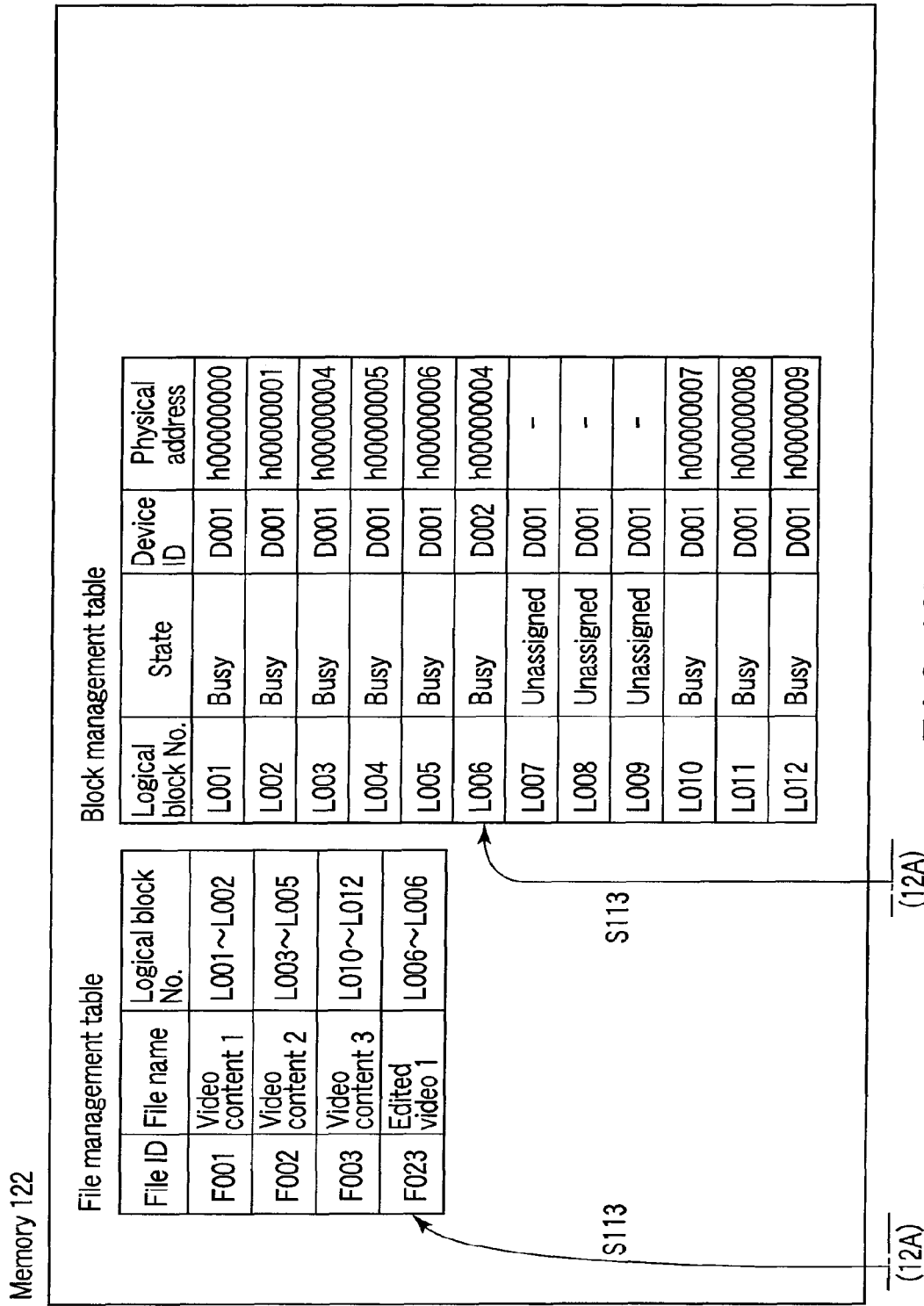
FIG. 12B is a view showing the states of the memory in the case where the processing of FIG. 11 is carried out.
Figure 12C:
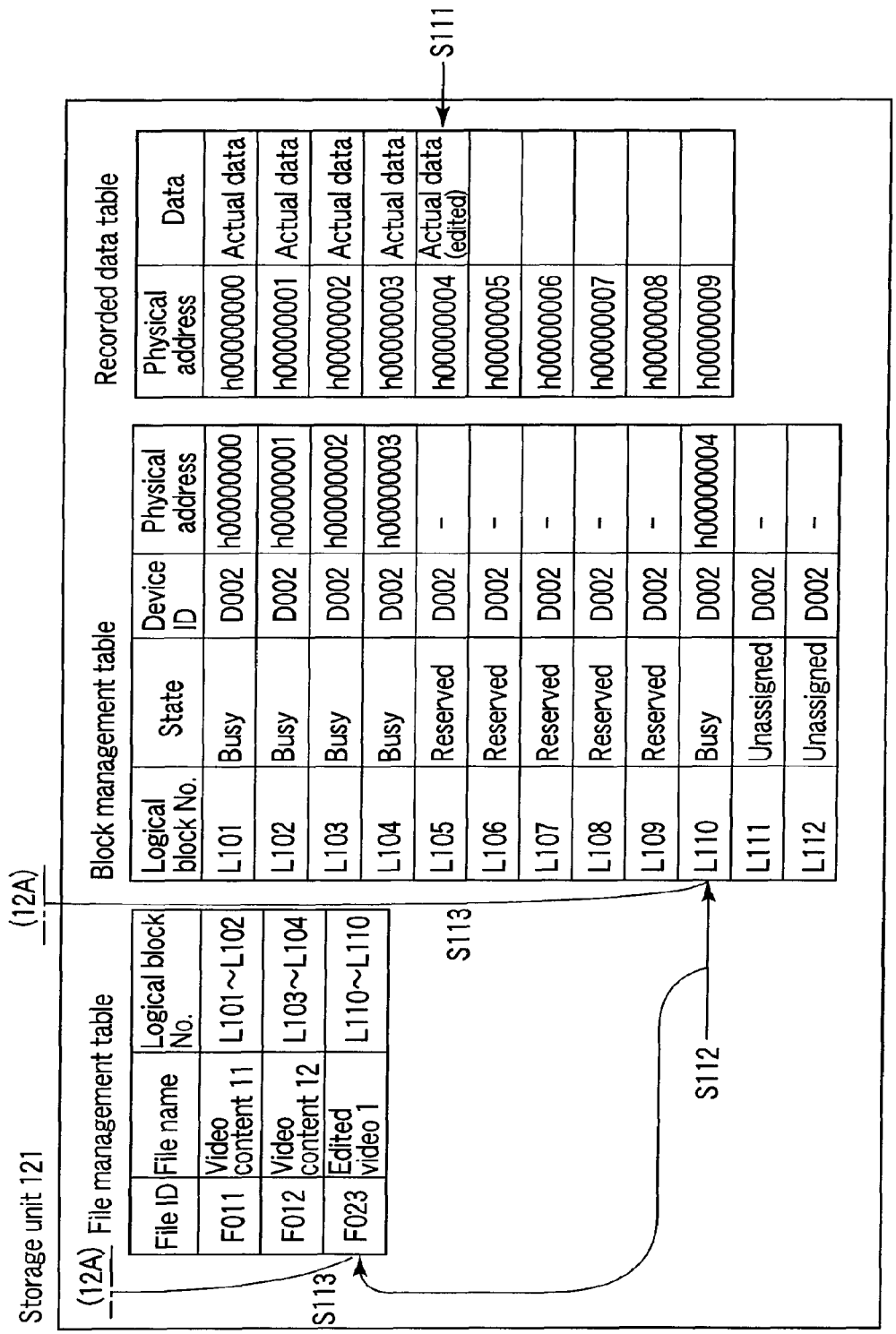
FIG. 12C is a view showing the states of the storage unit in the case where the processing of FIG. 11 is carried out.

Next, the case where after the preparation of FIG. 5 is completed, a write request of an edited video file is received from the non-linear editing unit 30 will be described below. FIG. 11 is a sequence diagram at that time. Further, FIG. 12 is a schematic view showing the states of the removable storage medium 20, memory 122, and storage unit 121 in the case where a write request of the edited video 1 is input from the non-linear editing unit 30. FIG. 12A shows the states of the removable storage medium 20. FIG. 12B shows the states of the memory 122. FIG. 12C shows the states of the storage unit 121.

In FIG. 11, on receiving a write request of an edited video file: the edited video 1 from the non-linear editing unit 30, the processing unit 123 transfers the write request to the storage unit 121 to write the edited video 1 to the storage unit 121 (S111). As a result of this, the edited video 1 is written to the logical block (physical address: h00000004) of the storage unit 121. Further, the processing unit 123 updates the file management table and the block management table of the storage unit 121 (S112). The processing unit 123 updates the file management table and the block management table of the memory 122 on the basis of the write location of the video data in the storage unit 121 (S113).

As described above, after recording the edited video file on the storage unit 121, the processing unit 123 updates the file management table and the block management table of the memory 122 on the basis of the file management table and the block management table of the storage unit 121. As a result of this, in the video data processing system, the edited video file is always recorded on the storage unit 121, and the video file recorded on the storage unit 121 is also managed at the memory 122.

From the above description, according to the video data processing system of the present invention, it is possible to start non-linear editing of the acquired video file without waiting time.

In the video data processing system according to this embodiment, in the file management table of each of the removable storage medium 20, memory 122, and storage unit 121, a unique file ID is imparted to each video file. As a result of this, it becomes possible to limit transfer of video files with the same file ID by collating the file ID of a video file transferred from the removable storage medium 20 to the storage unit 121 and the file ID of a video file recorded on the storage unit 121 with each other.

It should be noted that the processing of the video data processing system according to this embodiment is not limited to the above-mentioned content. For example, the transfer of the video file does not necessarily conform to the sequence shown in FIG. 7, and can also be carried out in accordance with the sequence shown in FIG. 13. FIG. 14 is a schematic view showing the states of the removable storage medium 20, memory 122, and storage unit 121 in the case where the video data processing system 10 carries out the processing shown in FIG. 13. FIG. 14A shows the states of the removable storage medium 20. FIG. 14B shows the states of the memory 122. FIG. 14C shows the states of the storage unit 121.

Figure 13:
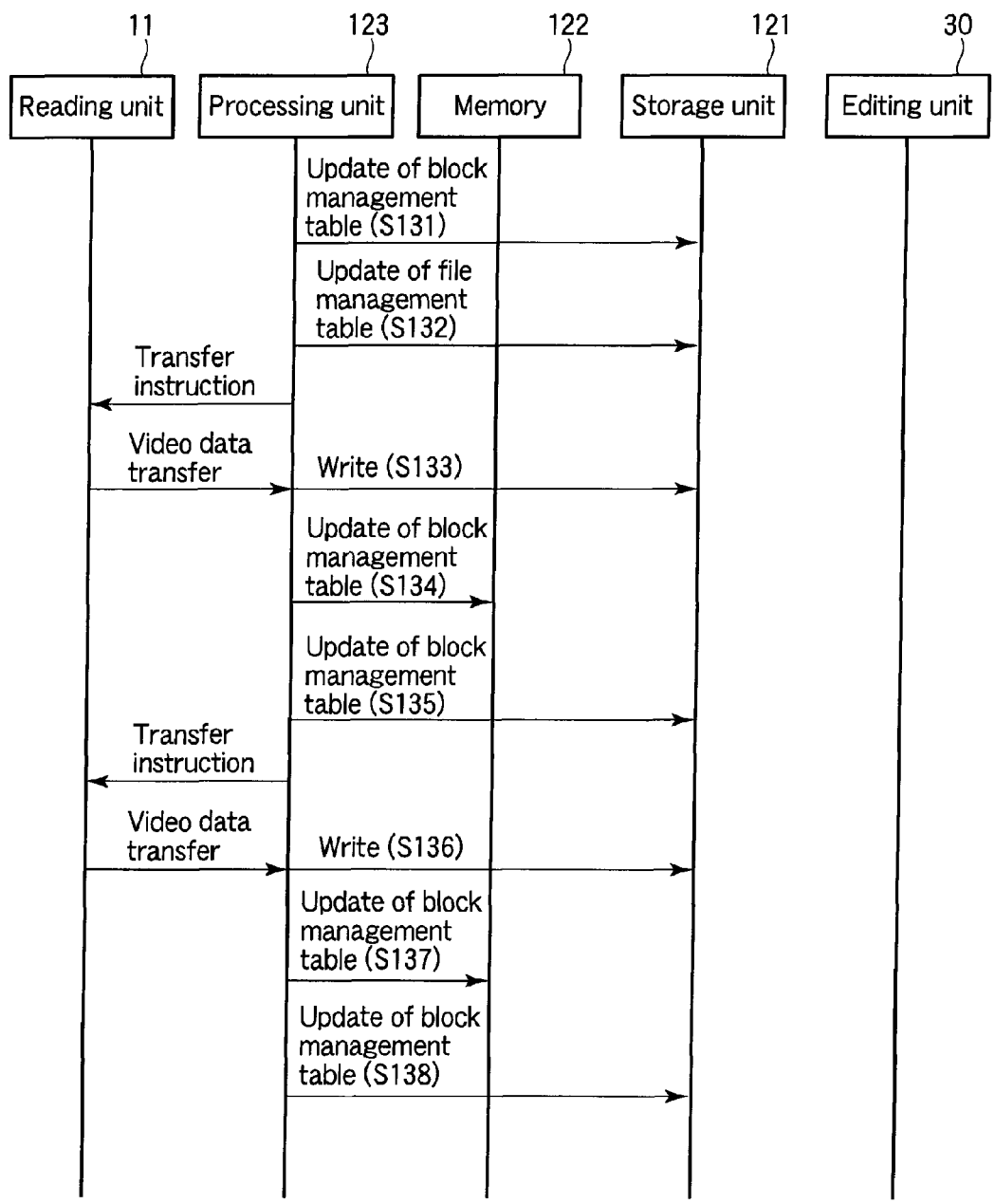
FIG. 13 is a sequence diagram of a case where a video file is transferred from the removable storage medium to the storage unit in the background in the procedure different from the transfer processing shown in the sequence diagram of FIG. 7.
Figure 14B:
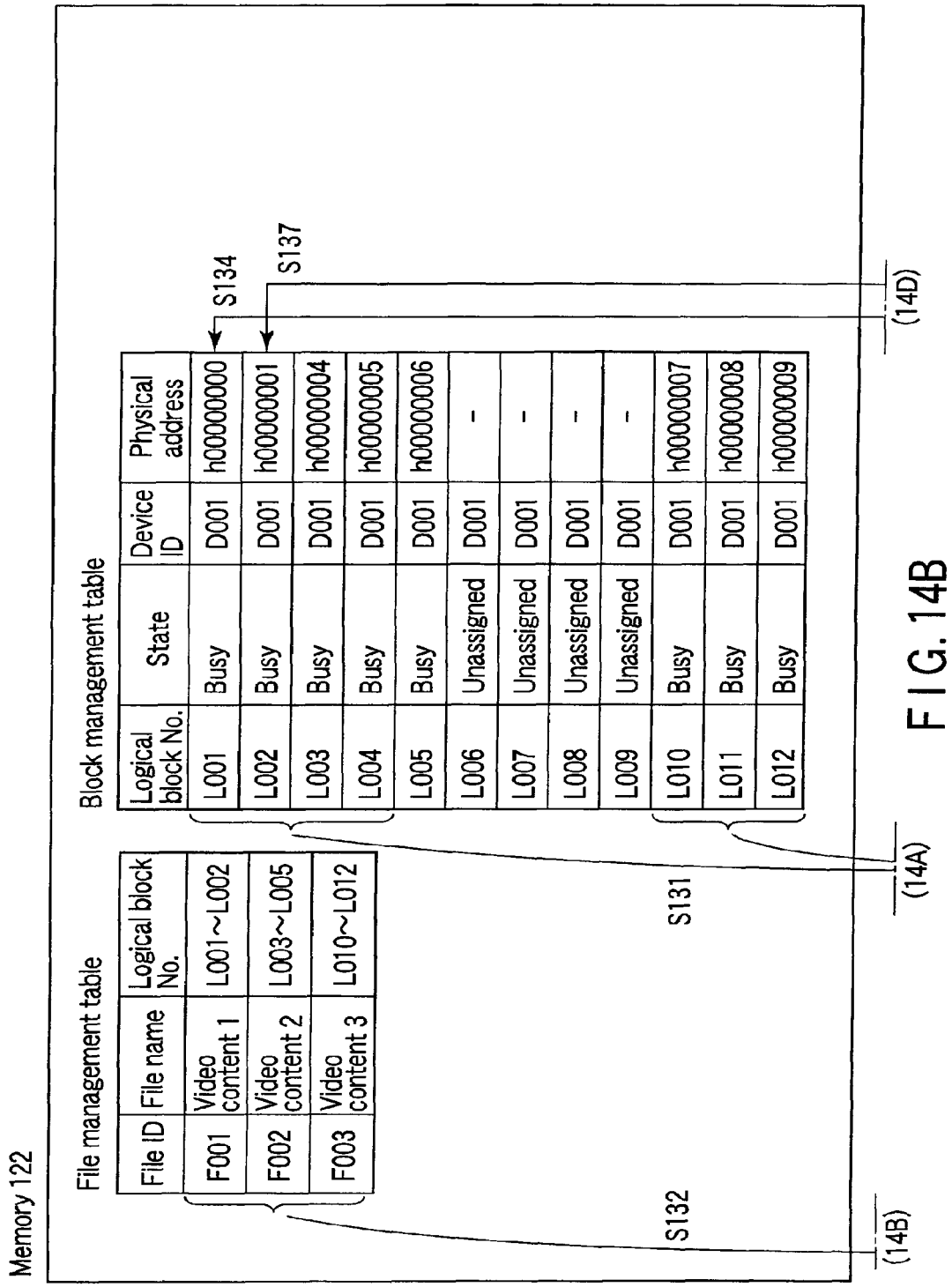
FIG. 14B is a view showing the states of the memory in the case where the processing of FIG. 13 is carried out.
Figure 14C:
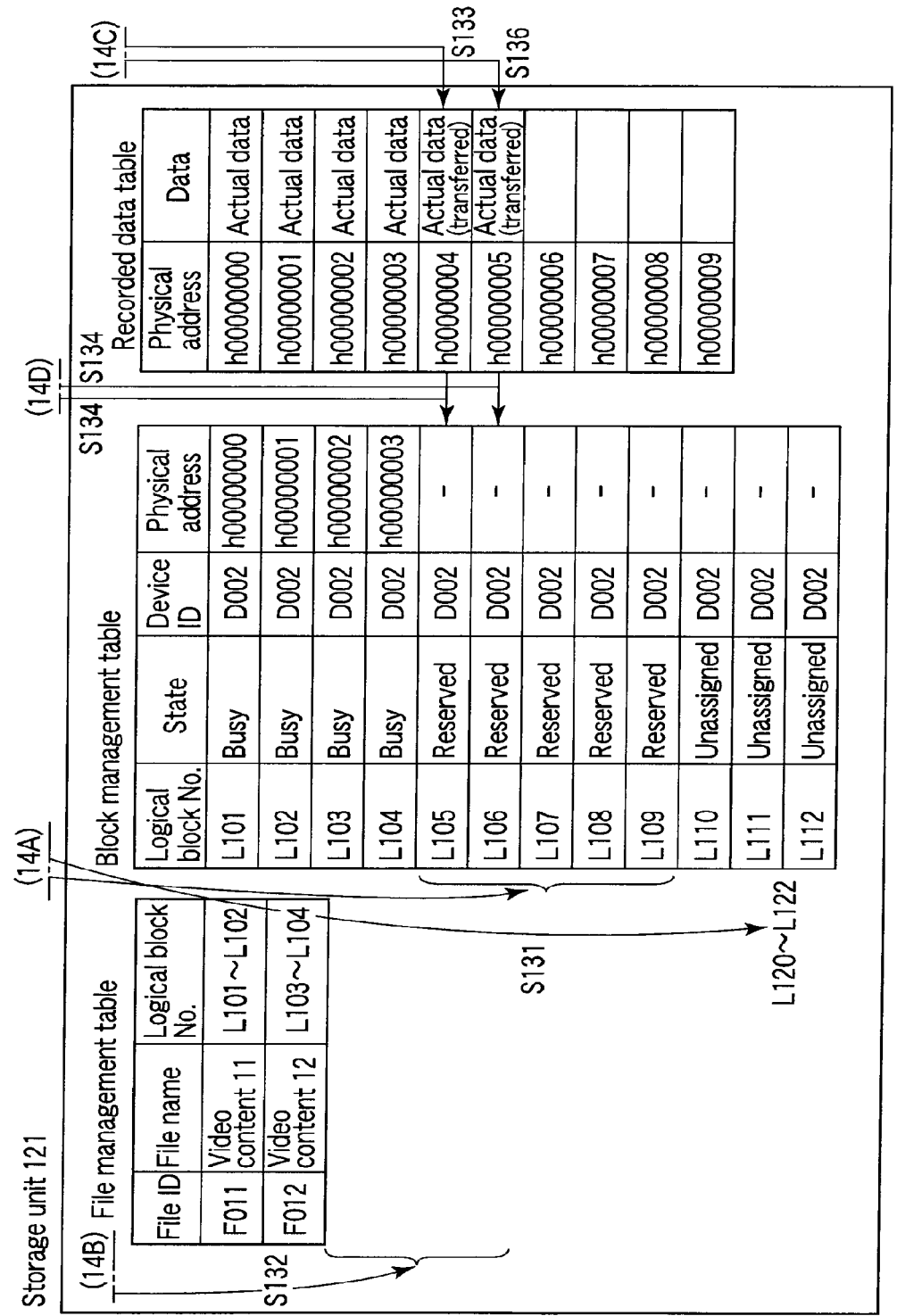
FIG. 14C is a view showing the states of the storage unit in the case where the processing of FIG. 13 is carried out.

That is, in FIG. 13, the processing unit 123 updates the block management table of the storage unit 121 on the basis of the block management table of the memory 122 (S131). That is, the states of the logical block Nos.: L105 to L109 and L120 to L122 are rewritten to be changed to "busy (in use)", the device ID is rewritten to be changed to D001, and the physical address is rewritten to be changed to the same physical address as the physical address of the memory 122. Subsequently, the processing unit 123 updates the file management table of the storage unit 121 on the basis of the file management table of the memory 122 (S132). That is, the video contents 1 to 3 recorded on the removable storage medium 20 are written to the file management table of the storage unit 121.

When the file management table of the storage unit 121 is updated, the processing unit 123 gives an instruction to transfer the video content 1 which is a video file recorded on the removable storage medium 20 to the reading unit 11. On receiving this instruction, the reading unit 11 transfers the video content 1 to the video server 12 in units of video data. The processing unit 123 records the video data transferred from the removable storage medium 20 on the unassigned address: h00000004 of the storage unit 121 (S133).

The processing unit 123 updates the block management table of the memory 122 on the basis of the write location of the video data in the storage unit 121, sets the device ID of the logical block No.: L001 to D002, and sets the physical address to h00000004 (S134). Further, the processing unit 123 updates the block management table of the storage unit 121 on the basis of the write location of the video data in the storage unit 121, sets the device ID of the logical block No.: L105 to D002, and sets the physical address to h00000004 (S135).

Having updated the block management tables of the memory 122 and storage unit 121, the processing unit 123 gives an instruction to transfer the next video data to the reading unit 11. The reading unit 11 reads the next video data from the removable storage medium 20, and transfers the video data to the video server 12 (S136). The processing unit 123 records the video data transferred from the removable storage medium 20 on the unassigned address: h00000005 of the storage unit 121.

The processing unit 123 updates the block management table of the memory 122 on the basis of the write location of the video data in the storage unit 121, sets the device ID of the logical block No.: L002 to D002, and sets the physical address to h00000005 (S137). Further, the processing unit 123 updates the block management table of the storage unit 121 on the basis of the write location of the video data in the storage unit 121, sets the device ID of the logical block No.: L106 to D002, and sets the physical address to h00000005 (S138). As a result of this, the video content 1 is transferred from the removable storage medium 20 to the storage unit 121.

The video data processing system 10 repeats the processing of S133 to S138 to transfer the video contents 2 and 3 which have been written to the file management table and the block management table of the storage unit 121 by the processing of S131 and S132 from the removable storage medium 20 to the storage unit 121.

As a result of this, even before the video file is transferred from the removable storage medium 20 to the storage unit 121, the file management table and the block management table of the removable storage medium 20 are merged into the file management table and the block management table of the storage unit 121. Thus, in the file management table and the block management table of the storage unit 121, the video file recorded on the removable storage medium 20 is also managed.

In the video data processing system according to this embodiment, the transfer processing of the video file may be carried out in the following manner to improve the performance of the editing processing to be carried out by the non-linear editing unit 30.

That is, If the read request or write request is not input from the non-linear editing unit 30 for a predetermined time, the processing unit 123 may give a transfer instruction to the reading unit 11. As a result of this, while the processing for the read request or write request from the non-linear editing unit 30 is carried out, the video data processing system 10 does not carry out transfer of the video file in the background. That is, it becomes possible for the video data processing system 10 to make the editing operation prior to the transfer of the video file.

The processing unit 123 may be provided with a cache for temporarily storing video data transferred from the removable storage medium 20 to the storage unit 121, and may refer to the cache data to output the video data of the video file which has been requested to be read to the non-linear editing unit 30.

Second Embodiment

Figure 15:
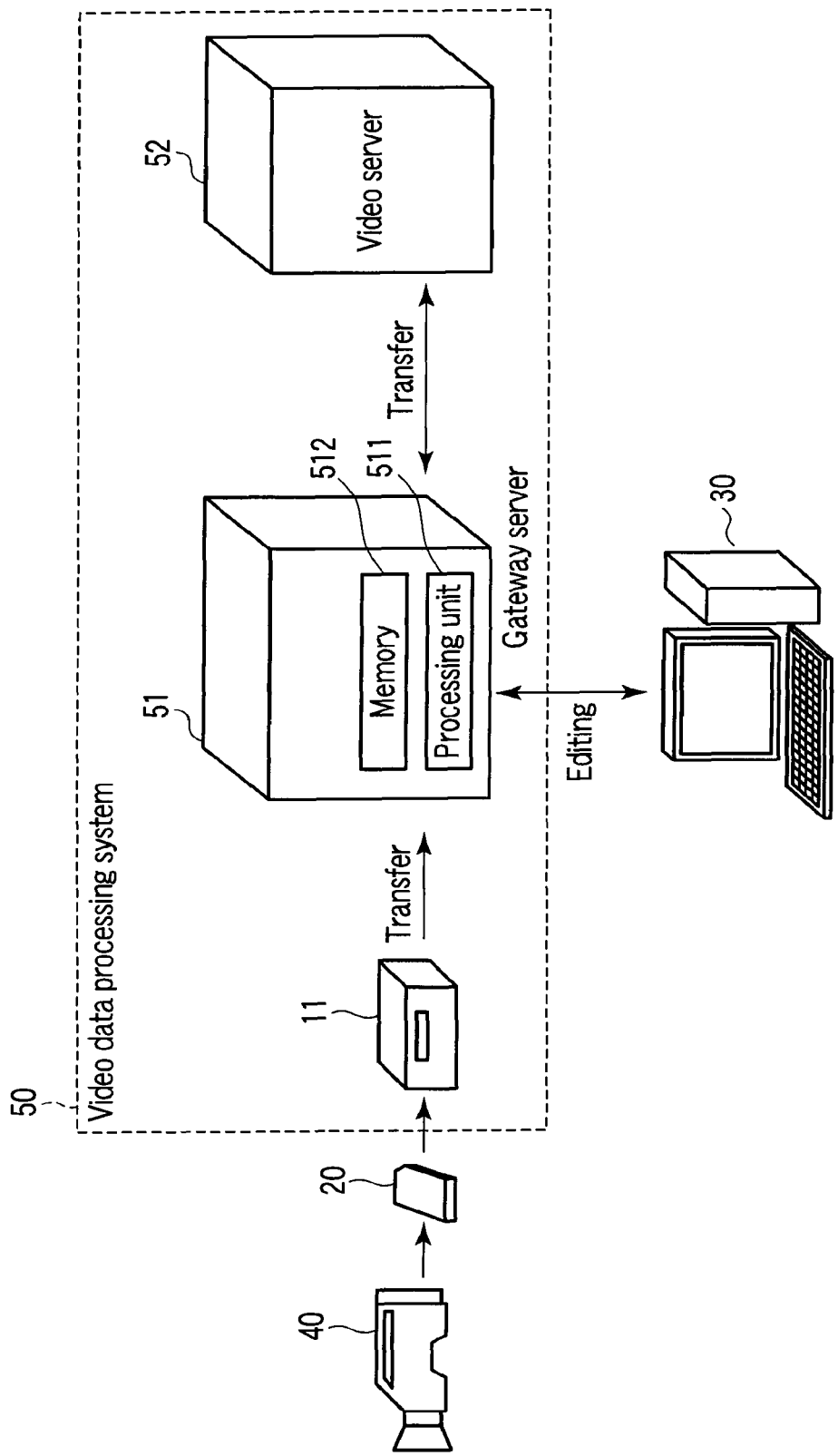
FIG. 15 is a view showing the configuration of a video data processing system according to a second embodiment of the present invention.

FIG. 15 is a schematic view showing the configuration of a video data processing system 50 according to a second embodiment of the present invention. The video data processing system 50 is provided with a reading unit 11, a gateway server 51, and a video server 52. A non-linear editing unit 30 is connected to the gateway server 51.

A video file recorded on a removable storage medium 20 is read by the reading unit 11, and is transferred to the video server 52 through the gateway server 51 to be recorded.

The video server 52 is provided with, for example, a semiconductor storage medium such as a flash memory and the like, or a storage medium such as a hard disk and the like, and records a video file transferred thereto. On the video server 52, a file management table for managing the recorded video file, and a block management table for managing the recording state of the storage medium are recorded in advance. The video server 52 updates these tables in accordance with an instruction from the gateway server 51.

The gateway server 51 is provided with a processing unit 511, and a memory 512. The processing unit 511 is embodied as a controller for controlling the memory 512 and the video server 52, and is configured by a microprocessor such as a CPU or the like. As the memory 512, for example, a RAM is used.

When the removable storage medium 20 is connected to the reading unit 11, the processing unit 511 updates the file management table and the block management table recorded in advance on each of the memory 512 and video server 52, prepares to transfer a video file recorded on the removable storage medium 20 to the video server 52, and prepares to carry out non-linear editing of the video file by using the non-linear editing unit 30.

If the preparation for transfer of the video file recorded on the removable storage medium 20 is completed, the processing unit 511 transfers the video file to the video server 52, and updates the file management tables and block management tables of the memory 512 and video server 52.

If the processing unit 511 receives a request to read the video file from the non-linear editing unit 30, the unit 123 outputs the requested video file to the non-linear editing unit 30 by referring to the file management tables and block management tables recorded on the removable storage medium 20, memory 512, and video server 52.

If the processing unit 511 receives a request to write the video file from the non-linear editing unit 30, the unit 511 transfers the video file to the video server 52, and causes the video server 52 to record the video file. Further, the processing unit 511 updates the file management tables and block management tables of the video server 52 and memory 512.

The non-linear editing unit 30 accesses the gateway server 51, and requests the gateway server 51 to read a video file desired to be edited. Further, the non-linear editing unit 30 requests the gateway server 51 to write the video file that has already been edited.

Next, the processing operation of the video data processing system 50 configured as described above will be described below. It should be noted that in this embodiment, a device ID: D001 indicates the removable storage medium 20, and device ID: D002 indicates the video server 52.

Figure 16:
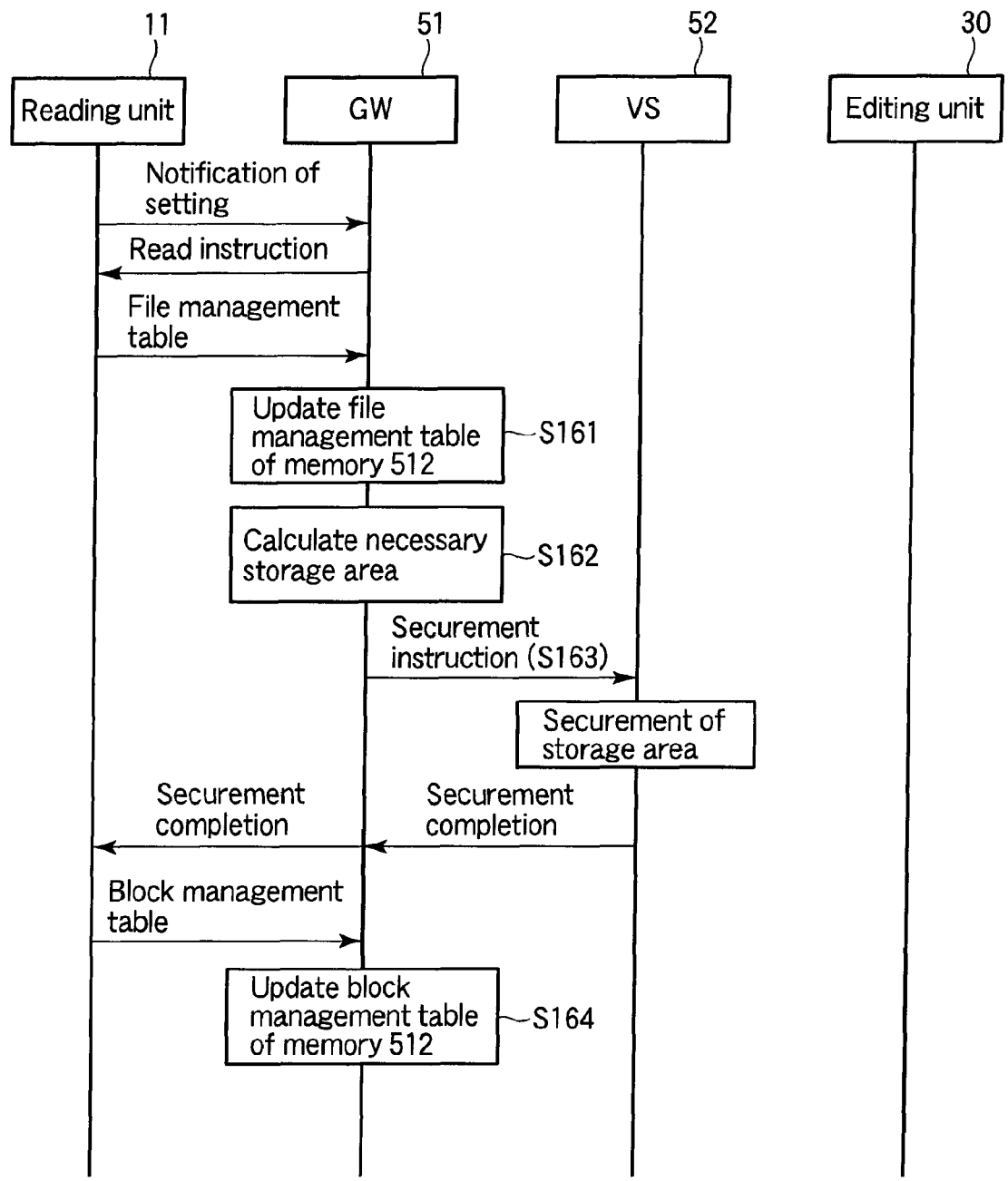
FIG. 16 is a sequence diagram of a case where the video data processing system of FIG. 15 prepares to transfer a video file recorded on a removable storage medium to a video server, and prepares to carry out non-linear editing of the video file by using a non-linear editing unit.
Figure 17C:
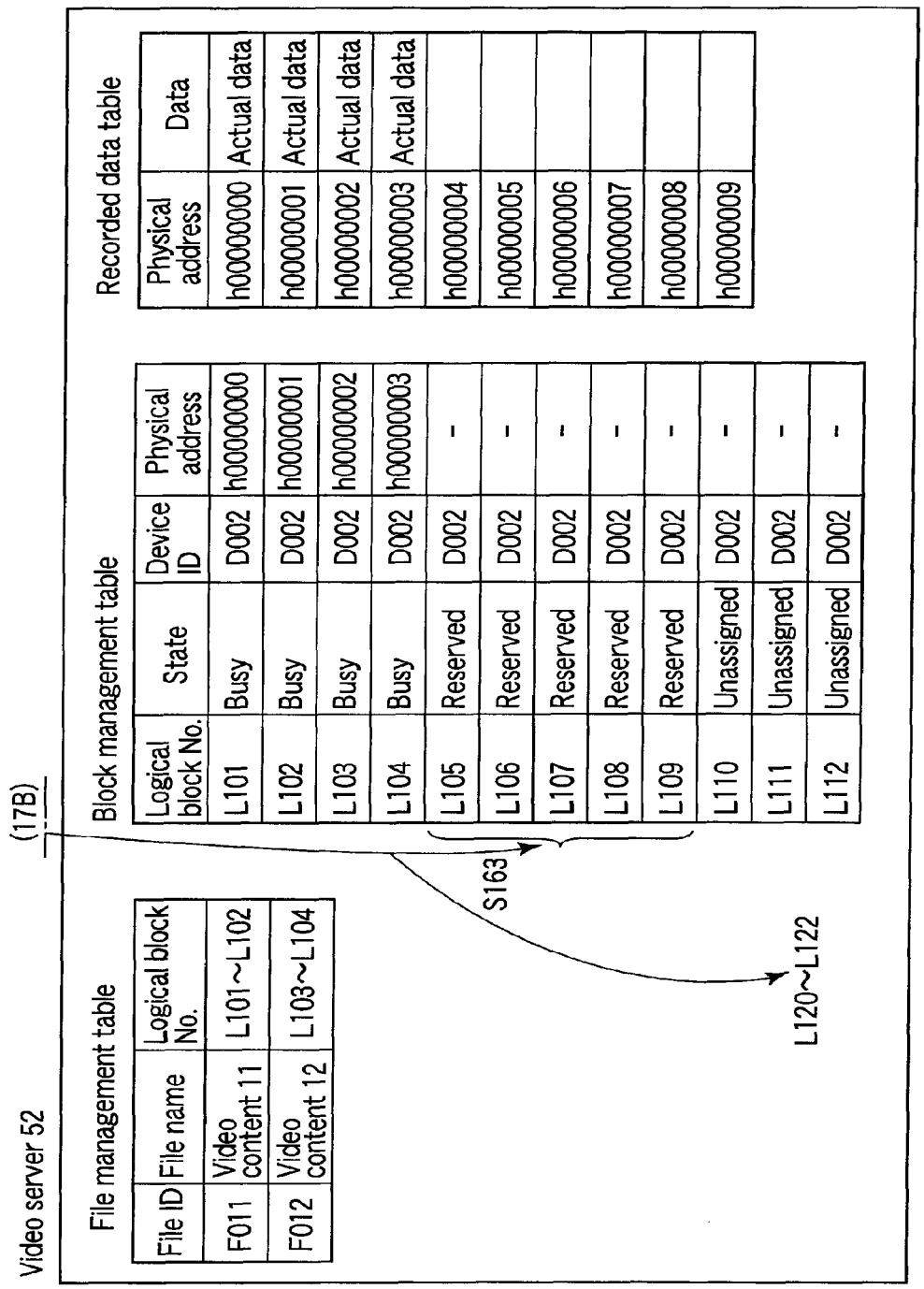
FIG. 17C is a view showing the states of the video server in the case where the processing of FIG. 16 is carried out.

FIG. 16 is a sequence diagram of a case where the video data processing system 50 according to the second embodiment of the present invention prepares to transfer a video file recorded on the removable storage medium 20 to the video server 52, and prepares to carry out non-linear editing of the video file by using the non-linear editing unit 30. Further, FIG. 17 is a schematic view showing the states of the removable storage medium 20, gateway server 51, and video server 52 in the case where the video data processing system 50 carries out the processing shown in FIG. 16. FIG. 17A shows the states of the removable storage medium 20. FIG. 17B shows the states of the gateway server 51. FIG. 17C shows the states of the video server 52.

In FIG. 16, when the removable storage medium 20 is set, the reading unit 11 notifies the gateway server 51 that the removable storage medium 20 is set. On receiving the notification indicating that the removable storage medium 20 is set, the processing unit 511 requests the reading unit 11 to provide information about the file management table. The reading unit 11 outputs the information about the file management table of the removable storage medium 20 to the gateway server 51.

The processing unit 511 updates the file management table of the memory 512 on the basis of the information about the file management table (S161). As a result of this, the information of the file management table of the removable storage medium 20 is written to the file management table of the memory 512.

Subsequently, the processing unit 511 calculates a storage area necessary for recording video contents 1 to 3 on the storage unit 121 (S162), and issues an instruction to secure a logical block on the basis of the calculated storage area to the video server 52 (S163). The video server 52 secures, on the basis of the calculated result, logical block Nos.: L105 and L106 to record the video content 1, secures logical block Nos.: L107 to L109 to record the video content 2, and secures logical block Nos.: L120 to L122 to record the video content 3. The video server 52 notifies the processing unit 511 that securing the storage area is complete. On receiving the notification, the processing unit 511 transfers it to the reading unit 11, which, as a result, outputs information about the block management table of the removable storage medium 20 to the processing unit 511. The processing unit 511 updates the block management table of the memory 512 on the basis of the information about the block management table (S164).

If the removable storage medium 20 is set at the reading unit 11 as described above, the video data processing system 50 updates the file management table and the block management table of the memory 512 on the basis of the file management table and the block management table of the removable storage medium 20. That is, in the memory 512, the management table of the removable storage medium 20 is managed. As a result of this, it can be considered that the video file recorded on the removable storage medium 20 is virtually recorded on the video server 52.

Processing to be performed after the preparation for transfer of the video file recorded on the removable storage medium 20 to the video server 52, and the preparation for non-linear editing of the video file by using the non-linear editing unit 30 have been completed by the processing shown in FIG. 16 will be described below.

Figure 19B:
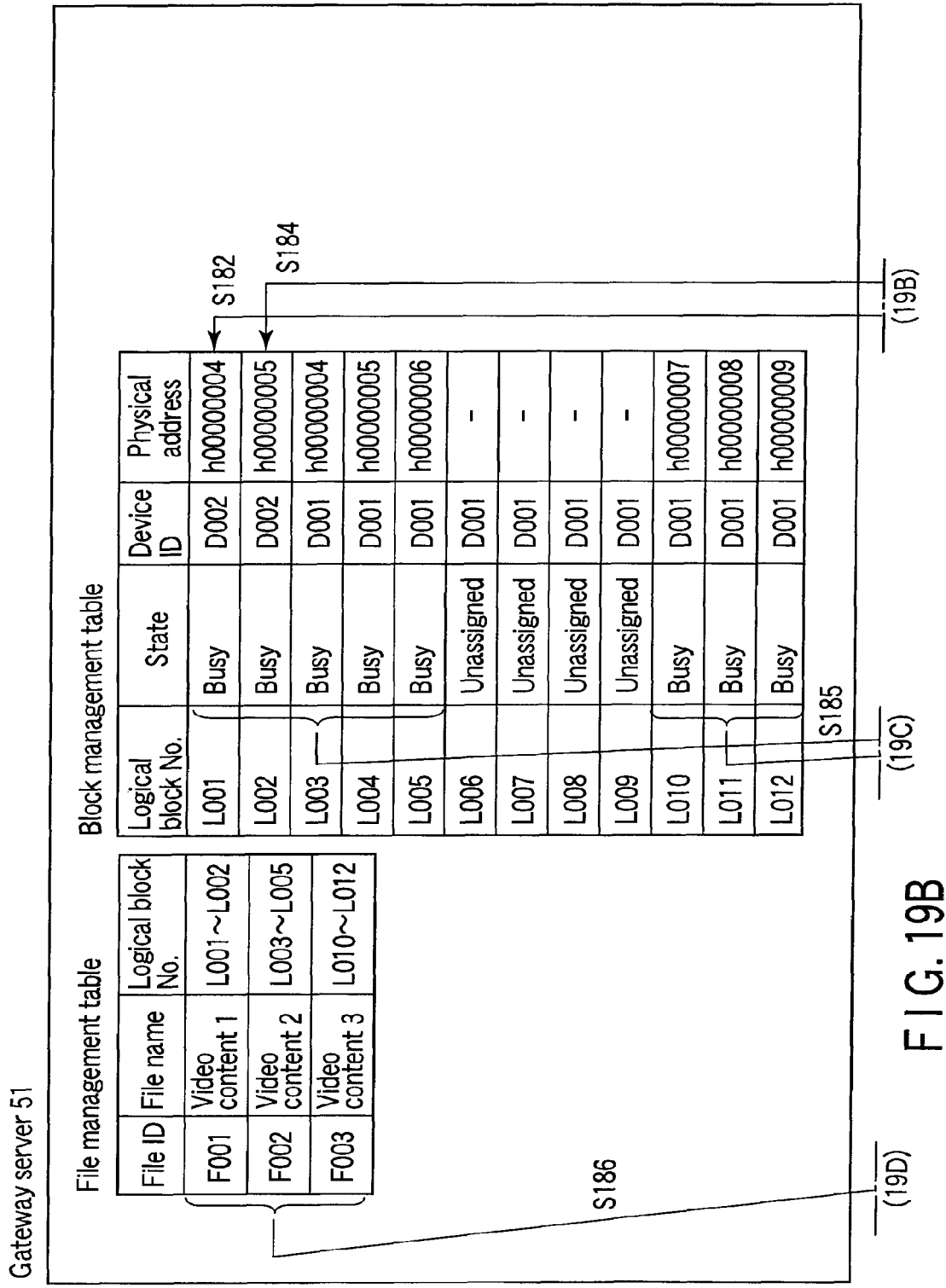
FIG. 19B is a view showing the states of the gateway server in the case where the processing of FIG. 18 is carried out.
Figure 19C:
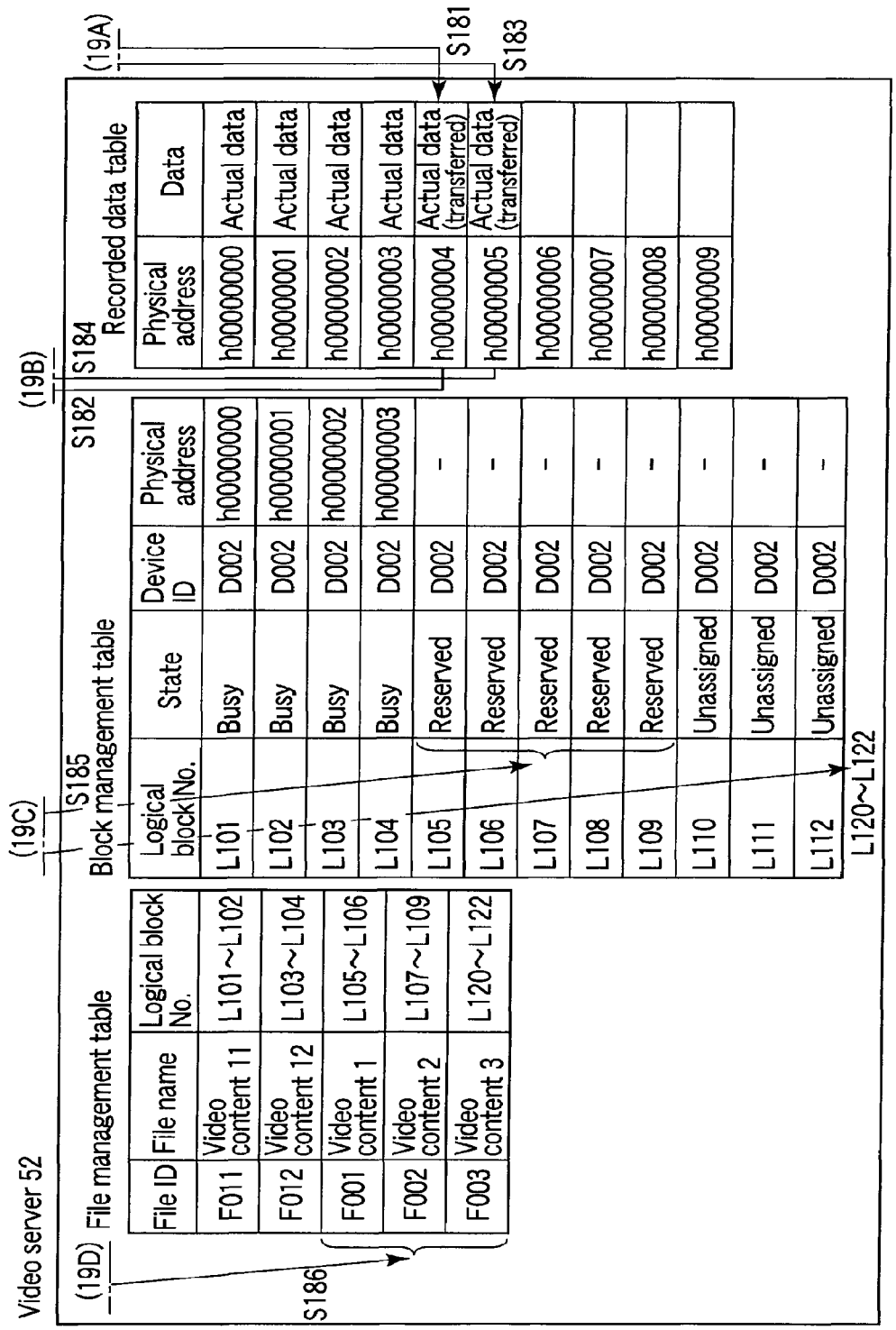
FIG. 19C is a view showing the states of the video server in the case where the processing of FIG. 18 is carried out.

First, the case where after the processing shown in FIG. 16 is completed, the video file is transferred from the removable storage medium 20 to the video server 52 in the background will be described below. FIG. 18 is a sequence diagram at the time. Further, FIG. 19 is a schematic view showing the states of the removable storage medium 20, gateway server 51, and video server 52 in the case where the video data processing system 50 carries out the processing shown in FIG. 18. FIG. 19A shows the states of the removable storage medium 20. FIG. 19B shows the states of the gateway server 51. FIG. 19C shows the states of the video server 52.

In FIG. 18, the processing unit 511 gives an instruction to transfer the video content 1 which is the video file recorded on the removable storage medium 20 to the reading unit 11. On receiving the instruction, the reading unit 11 transfers the video content 1 to the video server 12 in units of video data (S181). The video server 52 receives the video data transferred from the removable storage medium 20, and records the video data on an unassigned address: h00000004. On completing the recording of the video data, the video server 52 notifies the gateway server 51 of the write location of the video data. The processing unit 511 updates the block management table of the memory 512 on the basis of the notified write location, sets the device ID of the logical block No.: L001 to D002, and sets the physical address to h00000004 (S182).

When the block management table of the memory 512 is updated, the processing unit 511 gives the reading unit 11 an instruction to transfer the next video data. The reading unit 11 reads the next video data from the removable storage medium 20, and transfers the video data to the video server 52 (S183). The video server 52 receives the video data transferred from the removable storage medium 20, and records the video data on an unassigned address: h00000005. When the recording of the video data is completed, the video server 52 notifies the gateway server 51 of the write location of the video data. The processing unit 511 updates the block management table of the memory 512 on the basis of the notified write location, sets the device ID of the logical block No.: L002 to D002, and sets the physical address to h00000005 (S184). As a result of this, the video content 1 is transferred from the removable storage medium 20 to the video server 52.

The video data processing system 50 repeats the processing of S181 to S184 to transfer the video contents 2 and 3 which are video files recorded on the removable storage medium 20 to the video server 52. Further, on completing the transfer of the video files recorded on the removable storage medium 20, the reading unit 11 notifies the gateway server 51 that the transfer of the video files recorded on the removable storage medium 20 has been completed. On receiving the notification indicating that the transfer has been completed, the processing unit 511 outputs information about the block management table of the memory 512 to the video server 52.

The video server 52 updates the block management table on the basis of the information supplied from the gateway server 51 (S185). That is, the device IDs and physical addresses of the logical block Nos.: L105 to L109, and L120 to L122 in the video server 52 are rewritten to be changed to the device IDs and physical addresses of the logical block Nos.: L001 to L005, and L010 to L012 in the memory 512, and the states of the logical block Nos.: L105 to L109, and L120 to L122 in the video server 52 are rewritten to be changed to "busy (in use)". Subsequently, the processing unit 511 outputs information about the file management table of the memory 512 to the video server 52. The video server 52 updates the file management table on the basis of the information supplied from the gateway server 51 (S186). That is, the video contents 1 to 3 transferred from the removable storage medium 20 are written to the file management table of the video server 52. As a result of this, the transfer processing is completed.

As described above, the processing unit 511 transfers the video data from the reading unit 11 to the video server 52, and updates the block management table of the memory 512. Further, if the transfer of the video data is completed, the processing unit 511 updates the file management table and the block management table of the video server 52 on the basis of the file management table and the block management table of the memory 512. As a result of this, in the video data processing system 50, it becomes possible, after the completion of the video file transfer, to merge the file management table and the block management table of the memory 512 into the file management table and the block management table of the video server 52. Accordingly, it becomes possible to improve the transfer efficiency of the video file. It should be noted that this transfer processing can be executed while the non-linear editing is executed by the non-linear editing unit 30.

The video files with the stronger possibility of being accessed are transferred to the video server earlier, whereby it becomes possible to improve the response speed with respect to the editing operation. Specific examples of the above will be shown below.

The processing unit 511 may give a transfer instruction to the reading unit 11 in such a manner that video data of a plurality of consecutive logical blocks on which video files which become objects of read requests are recorded is preferentially transferred. As a result of this, video data with the stronger possibility of being accessed is transferred to the video server 52.

The processing unit 511 may give a transfer instruction to the reading unit 11 in such a manner that a video file in which the creation time, update time or the like is close to that of the video file that has been requested to be read is preferentially transferred.

The processing unit 511 may give a transfer instruction to the reading unit 11 in such a manner that a video file in which the creation time is the latest is preferentially transferred.

The processing unit 511 may give a transfer instruction to the reading unit 11 in such a manner that video data of a logical block on which the leading head of the video file is recorded for the convenience of preview or the like is preferentially transferred.

An order determination unit is further provided in the gateway server 51. Further, the processing unit 511 may give a transfer instruction to the reading unit 11 in such a manner that the video data are transferred preferentially in accordance with the order determined by the order determination unit.

Next, the case where after the preparation of FIG. 16 is completed, a request to read a video file recorded on the removable storage medium 20 is received from the non-linear editing unit 30 will be described below. FIG. 20 is a sequence diagram at that time.

In FIG. 20, on receiving a request to read the video file from the non-linear editing unit 30, the processing unit 511 refers to the file management table of the memory 512 to specify a logical block to be accessed. When the logical block to be accessed is specified, the processing unit 511 refers to the device ID and physical address shown in the block management table of the memory 512 to determine whether or not the video file which is requested to be read has already been transferred to the video server 52 (S201). That is, the processing unit 511 determines whether the video data of the video file is recorded on one of the removable storage medium 20 or video server 52.

When the video data of the video file is recorded on the video server 52, the processing unit 511 transfers the read request to the video server 52. On receiving the read request, the video server 52 outputs in sequence the video data of the video file which is requested to be read to the gateway server 51. The processing unit 511 transfers in sequence the video data output from the video server 52 to the non-linear editing unit 30.

In the case where the video data of the video file is recorded on the removable storage medium 20, the processing unit 511 transfers the read request to the reading unit 11 (S202). On receiving the read request, the reading unit 11 reads the video data of the video file which is requested to be read from the removable storage medium 20. The processing unit 511 transfers in sequence the video data read by the reading unit 11 to the non-linear editing unit 30 (S203).

When the processing unit 511 transfers the video data to the non-linear editing unit 30, the unit 511 transfers the video data to the video server 52 in sequence (S204). The video server 52 receives the video data transferred in sequence from the gateway server 51, and records the video data on an unassigned address. On completing the recording of the video data, the video server 52 notifies the processing unit 511 of the write location of the video data. The processing unit 511 updates the block management table of the memory 512 on the basis of the notified write location (S205). Further, on completing the transfer of the video file to the video server 52, the processing unit 511 updates the file management table and the block management table of the video server 52 on the basis of the file management table and the block management table of the memory 512 (S206).

When the output of the video file requested by the non-linear editing unit 30 is completed, the processing unit 511 notifies the non-linear editing unit 30 that the output of the video file is completed.

Figure 21A:
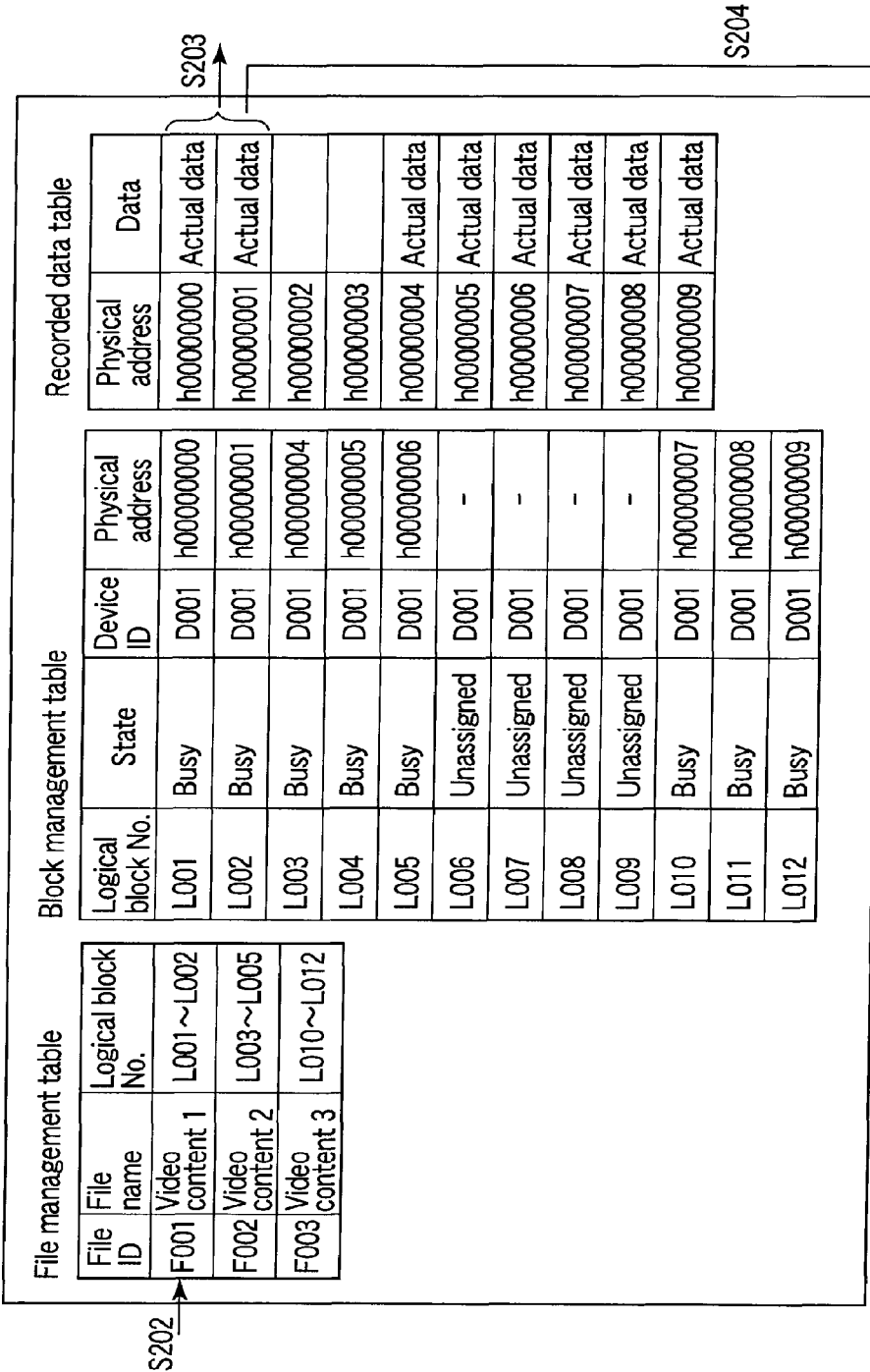
FIG. 21A is a view showing the states of the removable storage medium in the case where the processing of FIG. 20 is carried out.
Figure 21B:
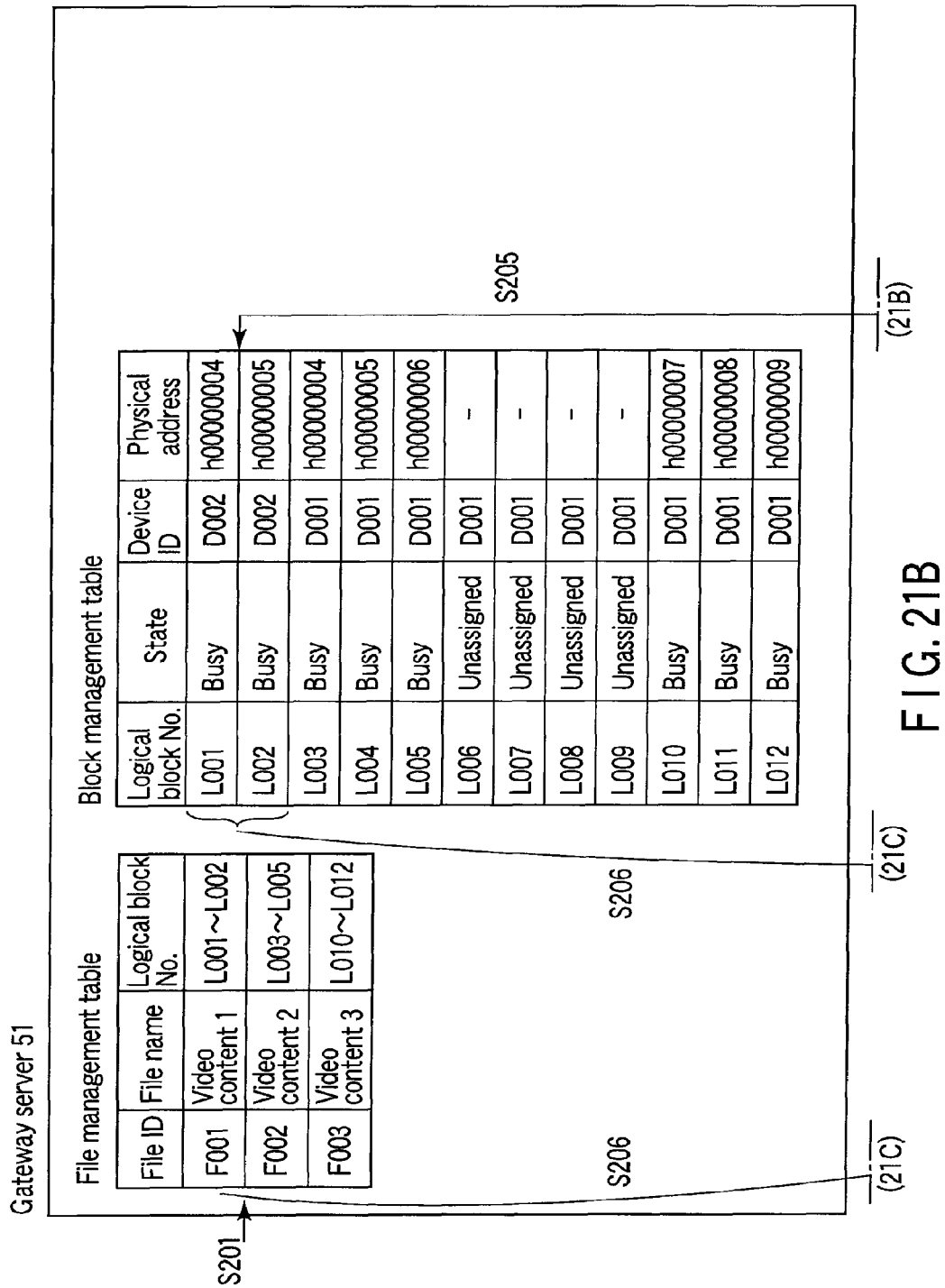
FIG. 21B is a view showing the states of the gateway server in the case where the processing of FIG. 20 is carried out.
Figure 21C:
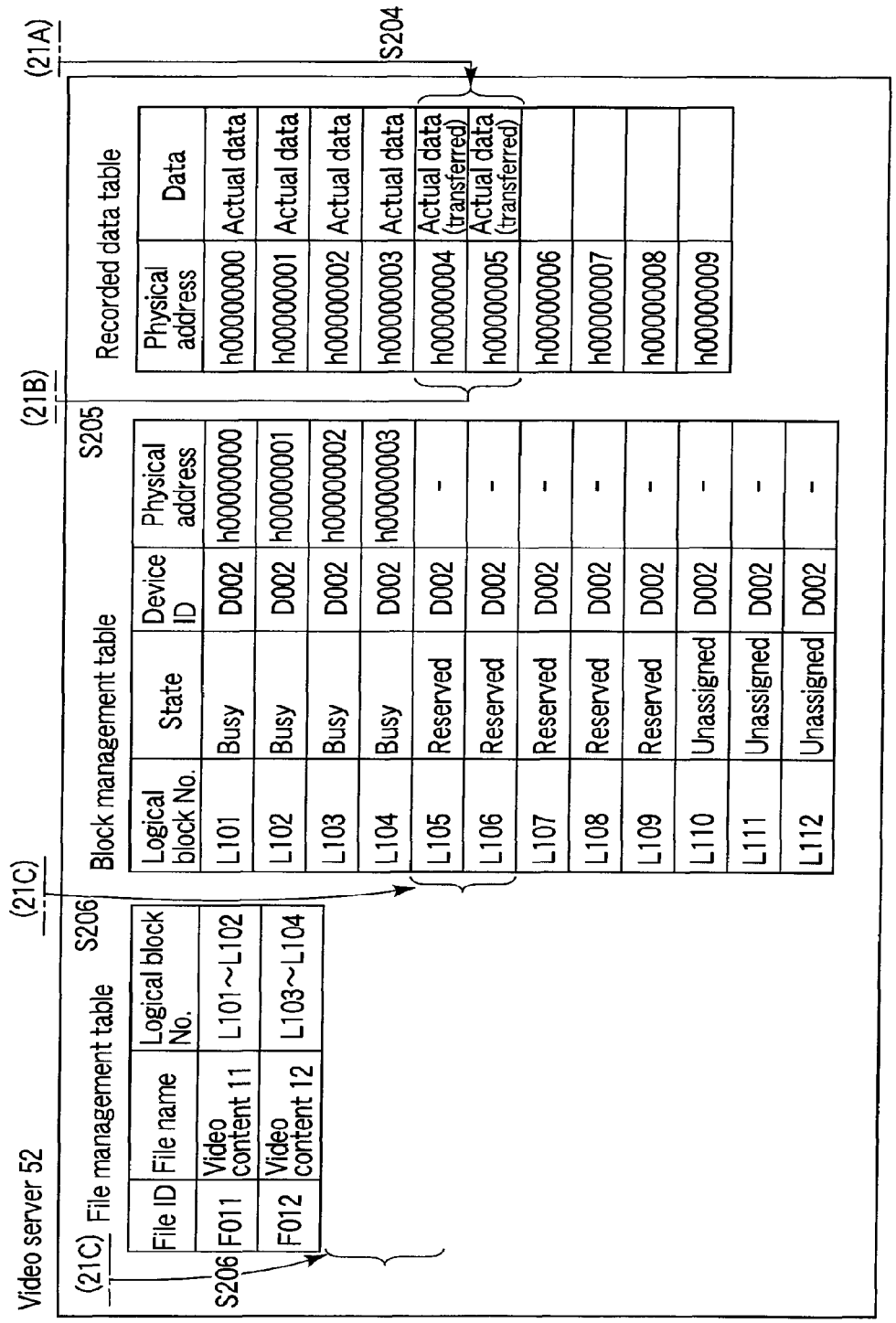
FIG. 21C is a view showing the states of the video server in the case where the processing of FIG. 20 is carried out.

FIG. 21 is a schematic view showing the states of the removable storage medium 20, gateway server 51, and video server 52 in the case where a request to read the video content 1 is input from the non-linear editing unit 30. FIG. 21A shows the states of the removable storage medium 20. FIG. 21B shows the states of the gateway server 51. FIG. 21C shows the states of the video server 52.

On receiving the read request of the video content 1 from the non-linear editing unit 30, the processing unit 511 refers to the file management table and the block management table of the memory 512 to determine that the video content 1 is recorded on the removable storage medium 20 (S201). The processing unit 511 transfers the read request of the video content 1 to the reading unit 11 (S202). On receiving the read request, the reading unit 11 reads the video data of the video content 1 from the removable storage medium 20. The processing unit 511 transfers the read video data to the non-linear editing unit 30 in sequence (S203).

When the processing unit 511 outputs the video data of the video content 1 to the non-linear editing unit 30, the unit 511 transfers the video data in sequence to the video server 12 (S204). The video server 52 receives the transferred video data, and records the video data in sequence on the unassigned addresses: h00000004 and h00000005. On completing the recording of the video data, the video server 52 notifies the processing unit 511 of the write location of the video data. The processing unit 511 updates the block management table of the memory 512 on the basis of the notified write location (S205), sets the device IDs of the logical block Nos.: L001 and L002 of the memory 512 to D002, and sets the physical addresses to h00000004 and h00000005. Further, on completing the transfer of the video content 1, the processing unit 511 updates the file management table and the block management table of the video server 52 on the basis of the file management table and the block management table of the memory 512 (S206).

As described above, in the video data processing system 50, if the read request of the video file is input from the non-linear editing unit 30, the storage position of the video data of the requested video file is determined by referring to the management tables of the memory 512. Further, if the storage position of the video data is determined, the processing unit 511 transfers the video data read from storage position in sequence to the non-linear editing unit 30. As a result of this, it becomes possible for the video data processing system 50 to transfer the video file to the non-linear editing unit 30, even if the video file of the removable storage medium 20 has not been transferred to the video server 52. That is, it is possible for the non-linear editing unit 30 to start non-linear editing of the video file even if the video file recorded on the removable storage medium 20 has not been yet transferred to the video server 52.

In the case where a video file which will become an object of a read request is recorded on the removable storage medium 20, the video data processing system 50 outputs the video data thereof to the non-linear editing unit 30, and simultaneously writes the video data to the video server 52. As a result of this, the transfer efficiency of the video file is improved.

Figure 23B:
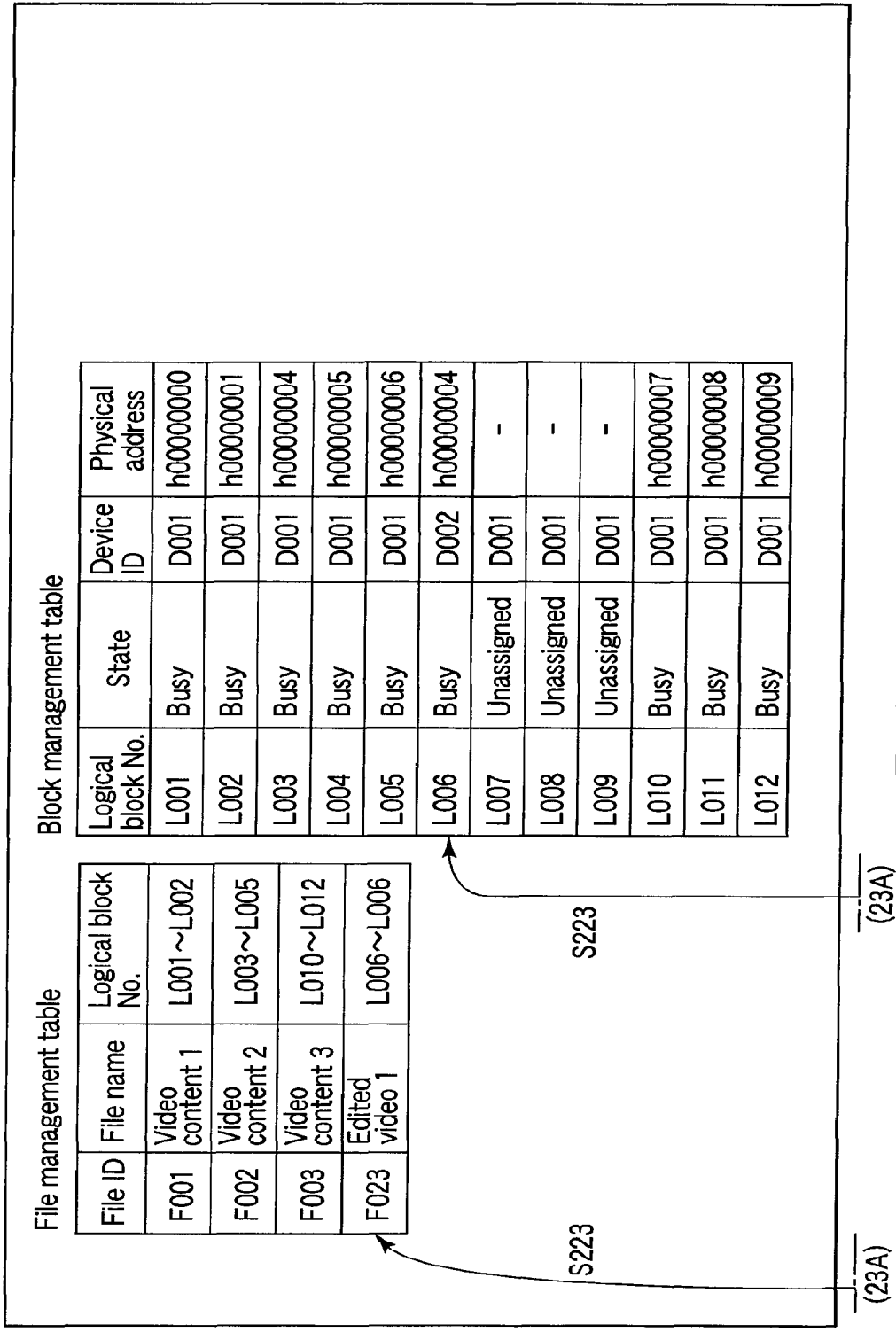
FIG. 23B is a view showing the states of the gateway server in the case where the processing of FIG. 22 is carried out.

Next, the case where after the preparation of FIG. 16 is completed, a write request of an edited video file is received from the non-linear editing unit 30 will be described below. FIG. 22 is a sequence diagram at that time. Further, FIG. 23 is a schematic view showing the states of the removable storage medium 20, gateway server 51, and video server 52 in the case where a write request of the edited video 1 is input from the non-linear editing unit 30.

In FIG. 22, on receiving a write request of an edited video file: the edited video 1 from the non-linear editing unit 30, the processing unit 511 transfers the write request to the video server 52. On receiving the write request, the video server 52 writes the video data of the edited video 1 to the physical address: h00000004 (S221). Further, on completing the writing of the video data, the video server 52 updates the file management table and the block management table (S222), and notifies the gateway server 51 of the write location of the video data. The processing unit 511 updates the file management table and the block management table of the memory 512 on the basis of the notification of the write location from the video server 52 (S223).

As described above, on receiving the write request of the edited video file, the gateway server 51 transfers the video file to the video server 52 to cause the video server 52 to record the video file. Further, after causing the video server 52 to record the video file, the gateway server 51 updates the file management table and the block management table of the memory 512 on the basis of the file management table and the block management table of the video server 52. As a result of this, in the video data processing system 50, the edited video file is also managed at the memory 512 of the gateway server 51.

From the above description, according to the video data processing system of the present invention, it is possible to start non-linear editing of the acquired video file without waiting time.

Other Embodiments

It should be noted that the present invention is not limited to the embodiments described above. For example, in each of the above-mentioned embodiments, the case where the reading unit 11 reads the video file and management tables from the removable storage medium 20, the video file and management tables being recorded on the inside of the medium 20, has been described. However, the operation of the reading unit 11 is not limited to reading data from the removable storage medium 20. For example, in the case where the camera is provided with an incorporated storage medium, the reading unit 11 may directly read the video file and management tables from the incorporated storage medium of the camera.

In each of the above embodiments, the example in which a semiconductor storage medium such as a flash memory and the like, or a storage medium such as a hard disk and the like is used is described. Here, in the case where a disk medium is used as the removable storage medium 20, if a plurality of processing items are simultaneously executed, the processing changeover overhead is large because of the seek time. Accordingly, in the present invention, employing a semiconductor storage medium such as a flash memory and the like as the removable storage medium 20 makes it possible to efficiently carry out the processing if an access for the editing operation and transfer processing of video data are concurrently carried out.

In each of the above embodiments, the example in which a read request and write request concomitant with the editing processing carried out by the non-linear editing unit 30 are received has been described. However, the access from outside is not limited to the non-linear editing unit 30. For example, a case where access processing is applied to the video server by a decoder device or the like is also practicable.

In each of the above embodiments, the example in which the terminal accessing from outside is only the non-linear editing unit 30 has been described. However, the external terminal is not limited to one. It should be noted that in the case where there are a plurality of external terminals, an order imparting unit for imparting the priority order to each of the external terminals may further be provided in the video server 12 or gateway server 51. As a result of this, if read requests are received from the plurality of external terminals, it becomes possible for the video server 12 or gateway server 51 to preferentially transfer video data to external terminals to which high priority order is imparted by the order imparting unit.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A gateway server used in a system for reading video data items included in a video content from a storage medium by a reading unit to record the video data items on a video server, the video data items being recorded in corresponding first logical blocks in the storage medium, wherein the reading unit which is connected to the storage medium to generate a setting signal, reads first management information including first physical addresses specifying blocks where the video data items are recorded in response to the setting signal, and reads the video data items from the first logical blocks, the video server which includes second logical blocks to record the video data items transferred from the reading unit in the second logical blocks, and stores second management information including second physical addresses specifying blocks where the video data items are recorded, said gateway server comprising:
 a memory which stores third management information including the first or second physical addresses; and
 a controller which writes the first physical addresses included in the first management information as the third management information in the memory in response to the setting signal, updates the first physical addresses included in the third management information to the second physical addresses upon reception of the video data items by the video server from the reading unit, outputs the video data items read from the reading unit if the third management information includes the first physical addresses, and outputs the video data items read from the video server if the third management information includes the second physical addresses in response to a read request for the video content including the video data items from an external device.

2. The gateway server according to claim 1, wherein
the first management information, the second management information, and the third management information each includes a file name identifying a video content, and
the controller limits transfer of video data in a video content which have already been transferred from the reading unit to the video server by comparing the file name in the first management information with the file name in the second management information.

3. The gateway server according to claim 1, wherein
if there is no read request and no write request within a preset period of time, the controller transfers the video data items from the reading unit to the video server.

4. The gateway server according to claim 1, wherein
the controller is provided with a cache for temporarily storing video data items transferred from the reading unit to the video server, and
the controller outputs the video data items stored in the cache to the external device in response to the read request.

5. The gateway server according to claim 1, wherein
the controller preferentially transfers video data items in a video content which has a high possibility to be designated by the read request from the reading unit to the video server.

6. The gateway server according to claim 1, further comprising,
an order imparting unit which imparts the priority order to each of a plurality of external devices which output the read requests,
wherein the controller outputs video data items in the video content designated by the read request from the external device which has higher priority to the other external devices.

* * * * *